United States Patent
Ackner

Patent Number: 6,081,621
Date of Patent: Jun. 27, 2000

[54] POSITIONING TEMPLATES IN OPTICAL CHARACTER RECOGNITION SYSTEMS

[75] Inventor: Reuven Ackner, Palo Alto, Calif.

[73] Assignee: Canon Kabushiki Kaisha, Tokyo, Japan

[21] Appl. No.: 08/724,478

[22] Filed: Oct. 1, 1996

[51] Int. Cl.[7] .................................................. G06K 9/62
[52] U.S. Cl. ......................................... 382/216; 382/209
[58] Field of Search .................................. 382/161, 206, 382/209, 216, 218, 229, 278, 295, 160, 226, 230

[56] References Cited

U.S. PATENT DOCUMENTS

| | | | |
|---|---|---|---|
| 4,019,173 | 4/1977 | Kono | 382/206 |
| 4,153,897 | 5/1979 | Yasuda et al. | 382/216 |
| 4,177,448 | 12/1979 | Brayton | 382/160 |
| 4,654,873 | 3/1987 | Fujisawa et al. | 382/209 |
| 5,073,963 | 12/1991 | Sammons et al. | 382/209 |
| 5,133,023 | 7/1992 | Bokser | 382/226 |
| 5,150,425 | 9/1992 | Martin et al. | 382/161 |
| 5,151,950 | 9/1992 | Hullender | 382/226 |
| 5,204,914 | 4/1993 | Mason et al. | 382/161 |
| 5,649,027 | 7/1997 | Mahajan et al. | 382/229 |

FOREIGN PATENT DOCUMENTS

| | | |
|---|---|---|
| 640934 | 3/1995 | European Pat. Off. ........ G06K 9/64 |
| 702329 | 3/1996 | European Pat. Off. . |
| 58-223884 | 12/1983 | Japan . |
| 63-129485 | 6/1988 | Japan . |
| 8-235307 | 9/1996 | Japan . |

OTHER PUBLICATIONS

Miloslavskaya, N.K., et al., "Minsk–1 Digital Computer Simulation of an Alogorithm for Handwritten Character Recognition", 1969, Soviet Automatic Control, vol. 14, No. 3, XP–002099694, pp. 42–45.

*Primary Examiner*—Yon J. Cuoso
*Attorney, Agent, or Firm*—Fitzpatrick, Cella, Harper & Scinto

[57] ABSTRACT

One dimensional horizontal and vertical reference projections are obtained for a reference character template. Similar one dimensional horizontal and vertical pattern projections are obtained for an unknown character pattern. The horizontal reference projection and horizontal pattern projection are compared, and the vertical reference projection and vertical pattern projection are compared. The reference character template is then positioned with respect to the unknown character pattern based on such comparisons in order to calculate a correlation coefficient between the two. In certain cases, the unknown character can be identified based solely on its one dimensional projections. Multiple characters in a character pattern are identified either one at a time or as a group. In the latter case, all possible combinations are generated using tree search processing, and the best combination is selected.

12 Claims, 23 Drawing Sheets

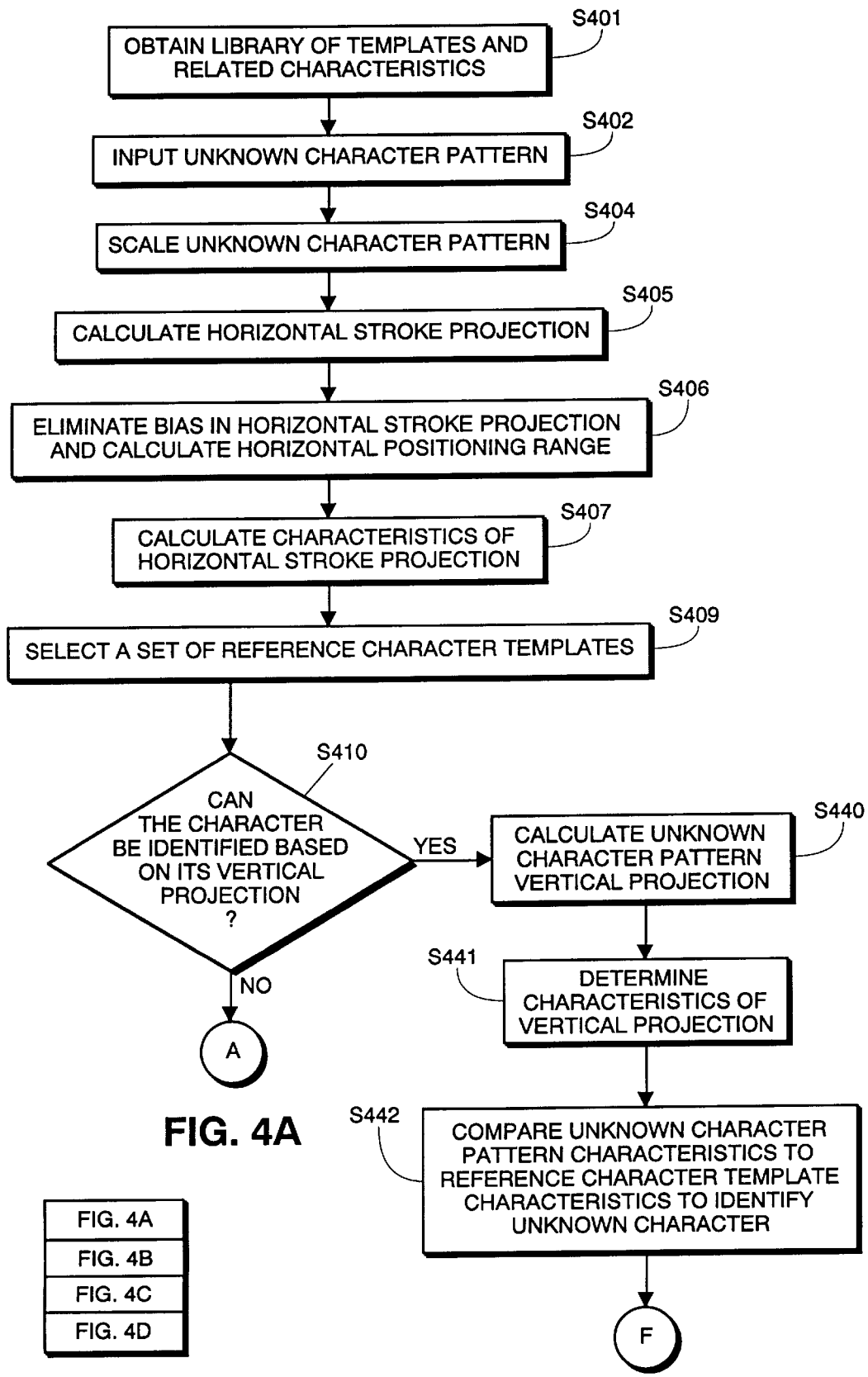

POSITIONING TEMPLATES IN OPTICAL CHARACTER RECOGNITION SYSTEMS

BACKGROUND OF THE INVENTION

1. Field Of The Invention

The present invention relates to optical character recognition systems and, more particularly, to methods and apparatuses for positioning a reference character template with respect to an unknown character pattern so as to be able to calculate a correlation factor between the two, and performing other character recognition processing related thereto.

2. Description Of The Related Art

In recent years, it has become possible to scan in paper copies of documents so as to form computerized images of such documents, analyze images in the text areas of the documents so as to recognize individual characters in the text data, and form computer readable files of character codes corresponding to the recognized characters. Such files can then be manipulated in word-processing, data-compression, or other information processing programs, and can also be used to retrieve the images of one or more of such documents in response to a query-based search of the text data. Such systems, which are hereinafter referred to as "character recognition systems", are advantageous because they eliminate the need to re-type or otherwise re-enter text data from the paper copies of the documents. For example, it is possible to recognition-process a document which has been transmitted by facsimile or reproduced from microfilm or by a photocopier so as to form computer text files that contain character codes (for example, ASCII character codes) of the characters in the document.

High accuracy optical character recognition systems employ a number of preliminary steps in order to isolate and pre-process individual character patterns within a bit map image of text, and then a correlation technique in order to determine the identity of each of the unknown character patterns. According to the correlation technique, plural reference character templates are selected sequentially from a library of such reference character templates, and a correlation factor is calculated between each such reference character template and the unknown character pattern. The correlation factor is a measure of similarity and varies between zero for no similarity to one for complete identity. Therefore, the identity of the unknown character pattern is designated according to the reference character template which yields the highest correlation factor to the unknown character pattern.

The process of computing a correlation factor between each reference character template and the unknown character pattern includes two steps. The first step involves positioning the reference character template with respect to the unknown character pattern, while the second step is the actual computation of the numerical value of the correlation factor, which as is well known can be calculated as follows:

$$\text{correlation factor} = \frac{\sum_{ij} \text{Ref}(i,j) * \text{Unknown}(i,j)}{\sqrt{\sum_{ij} \text{Ref}^2(i,j) * \sum_{ij} \text{Unknown}^2(i,j)}}$$

The first step, that is, the step of positioning the two images with respect to one another, is critically important because a small error in positioning can cause a large degradation in correlation. For example, an error of one pixel in vertical positioning has been known to Applicant to cause a reduction in the correlation factor of about 6%, i.e., a reduction in correlation from a perfect 1.000 to a correlation of 0.942. Because the reference character template which yields the highest correlation is designated as the identity of the unknown character pattern, it is readily apparent that an error in positioning can cause so great a reduction in the correlation factor that the unknown character pattern is identified incorrectly.

Various techniques for positioning the reference character template with respect to the unknown character pattern have been proposed, but all have drawbacks. For example, one known technique for positioning is to calculate, for each reference character template, the correlation factor at a variety of different relative positions and to select the highest correlation factor. Such a technique, while yielding accurate positioning data, is computationally too intensive to yield good OCR throughput. That is, because the above-noted correlation factor involves on the order of $n^2$ calculations (where n is the height in pixels of a typical character and is ordinarily around 40) and because a typical library of reference character templates has about 100 entries, the number of calculations needed to obtain a correlation factor for each template is already very high. To add even a small 3×3 grid search for the highest correlation factor for each template multiplies that already high number by a factor of 9.

Another known technique for positioning involves centroid weighting in which the center of mass in the vertical and horizontal directions is computed both for the unknown character pattern and for each reference character template. The grids of the two images are then aligned so that their centers of mass coincide. Such a technique for positioning, while computationally efficient, is relatively inaccurate and fails completely when the unknown character pattern contains more than one character, such as when multiple characters are touching.

Other methods for positioning have been proposed, but each is different from the technique proposed herein, and each has disadvantages.

SUMMARY OF THE INVENTION

It is an object of the present invention to address the foregoing difficulties and to provide a computationally efficient technique for positioning a reference character template with respect to an unknown character pattern so as to be able to calculate a correlation factor between the two.

According to the technique described herein, for each reference character template in a library of plural such reference character templates, horizontal and vertical projections are obtained for the pixel data in the reference character template. The horizontal and the vertical projections are essentially one-dimensional representations of the two-dimensional reference character templates. Then, for the unknown character pattern, similar horizontal and vertical projections are calculated, and a cross correlation function between the horizontal projections for the reference character template and the unknown character pattern, and a cross correlation function between the vertical projections for the reference character template and the unknown character pattern, are both calculated. The position at which the reference character template is applied to the unknown character pattern is then determined to be the horizontal and vertical positions where the cross correlation functions for the horizontal and vertical projections, respectively, have their maximum values.

Because positioning is based on one-dimensional horizontal and vertical projections, rather than on two-dimensional pixel data, determining the position of the reference character templates with respect to the unknown character pattern is computationally efficient. Specifically, because one-dimensional cross correlations involve calculations only on the order of n rather than $n^2$, the appropriate cross correlations can be calculated quickly. Moreover, because cross correlations are calculated based on both horizontal and vertical positions, accurate positioning in both the horizontal and vertical direction is readily obtained.

According to further aspects of the invention, horizontal and vertical projections are obtained based on stroke weight projection in which a weighted average of stroke position is obtained only for the first stroke encountered in the widthwise projection (in a case of the horizontal pattern projection) and for the first stroke encountered in the upward direction (in the case of the vertical pattern projection). Stroke weighting projection is advantageous in that it lessens the effect of extraneous noise pixels and provides a robust and reproducible projection of two-dimensional image data into one dimension. In addition, because stroke weighting projection uses only the first stroke encountered, stroke weighting projection is easily adaptable for use in a case of touching characters, i.e., where multiple character images are contained in a single unknown character pattern.

In yet further aspects of the invention, adapted particularly to cases involving multiple touching characters in an unknown character pattern, once a first character has been identified from the unknown character patterns, a baseline is calculated for the remaining characters. Thereafter, it is not necessary to calculate a vertical position at which templates are applied to the remaining unknown patterns; rather, it is necessary only to use the baseline identified from the first identified character.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENT

Figure 3:
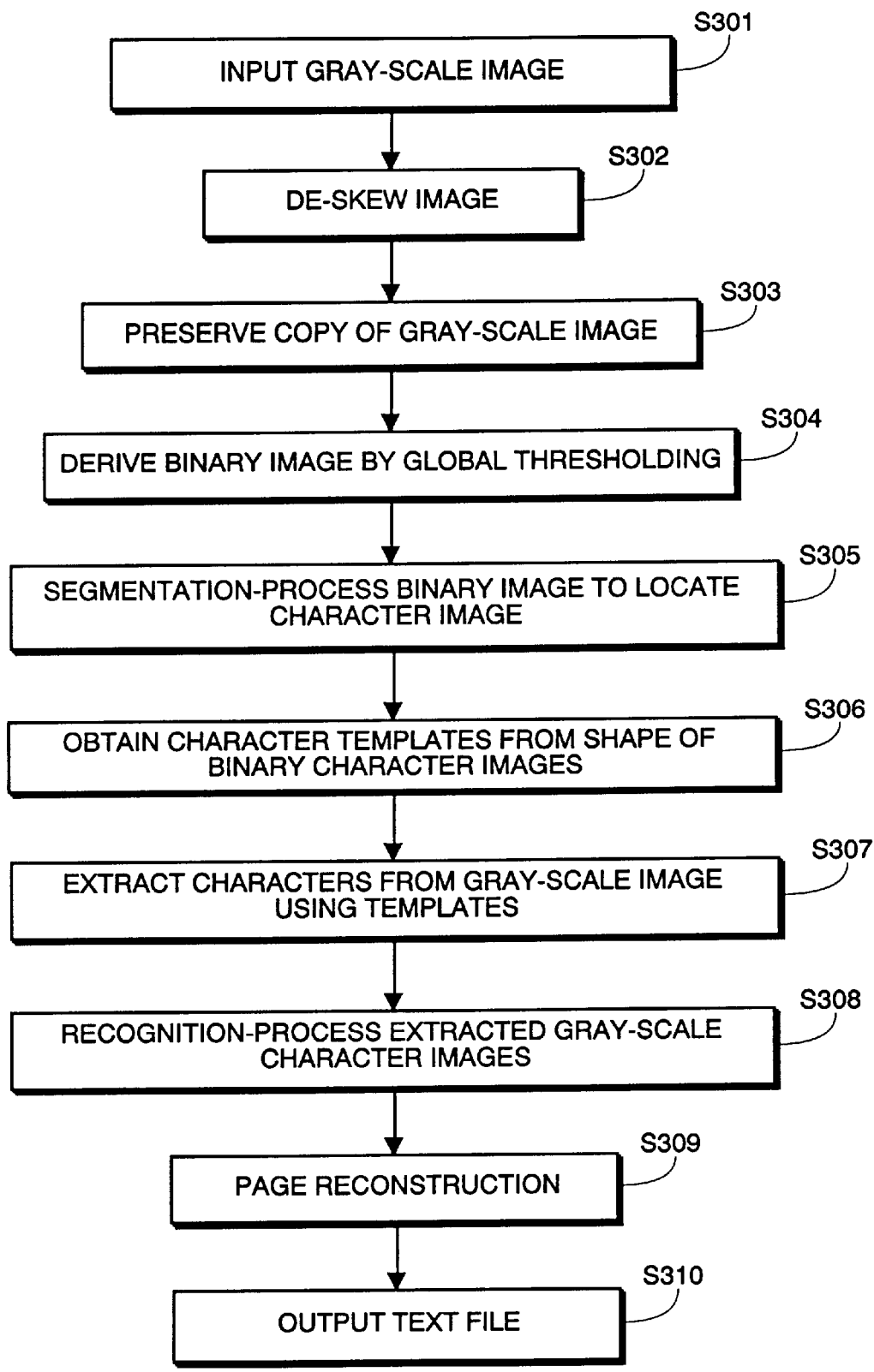
FIG. 3 is a flow diagram for explaining an image processing system that includes optical character recognition according to the invention.
Figure 4B:
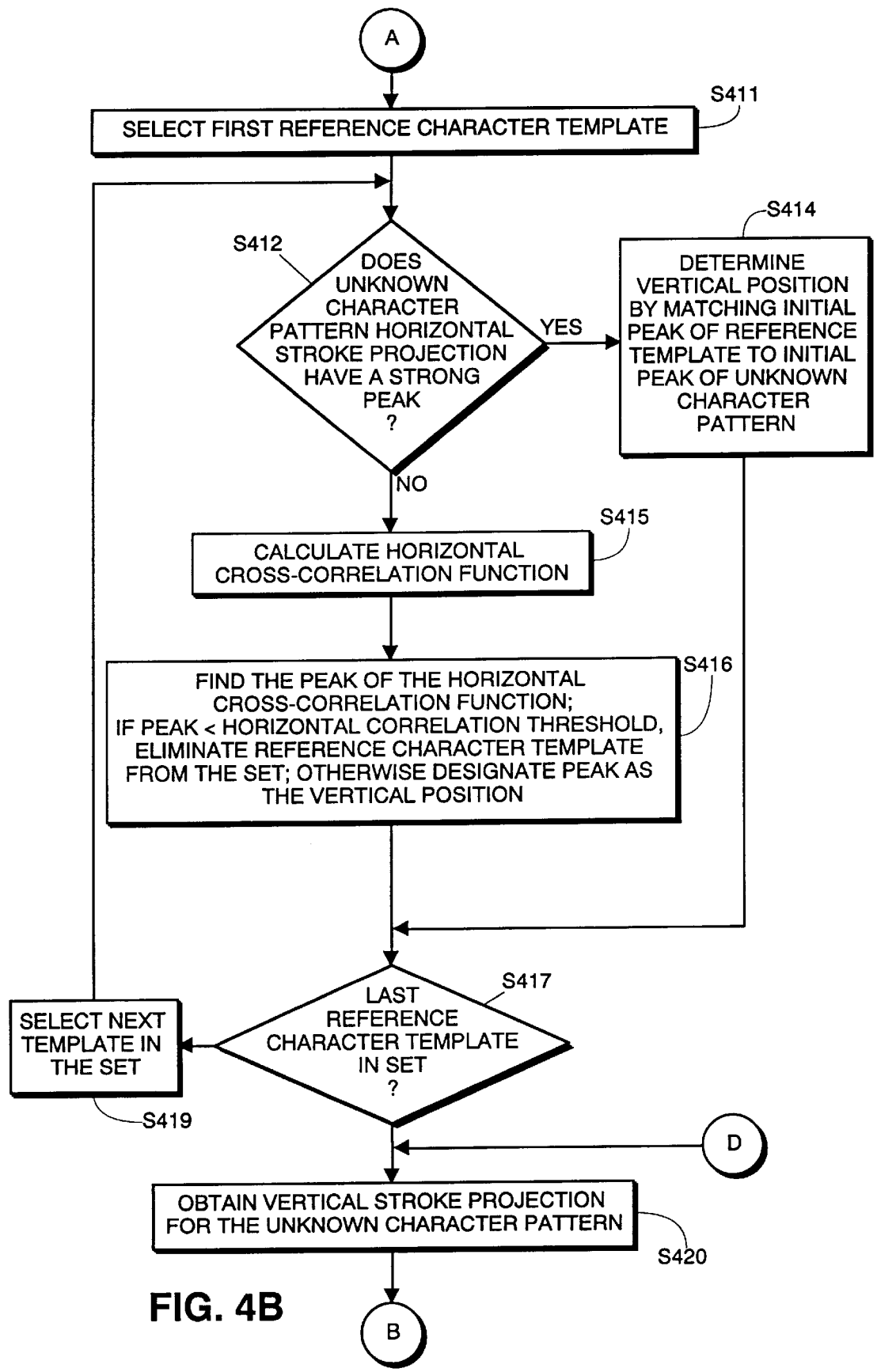
FIG. 4 comprising 4A–4D is a flow diagram showing recognition processing according to the invention.
Figure 4C:
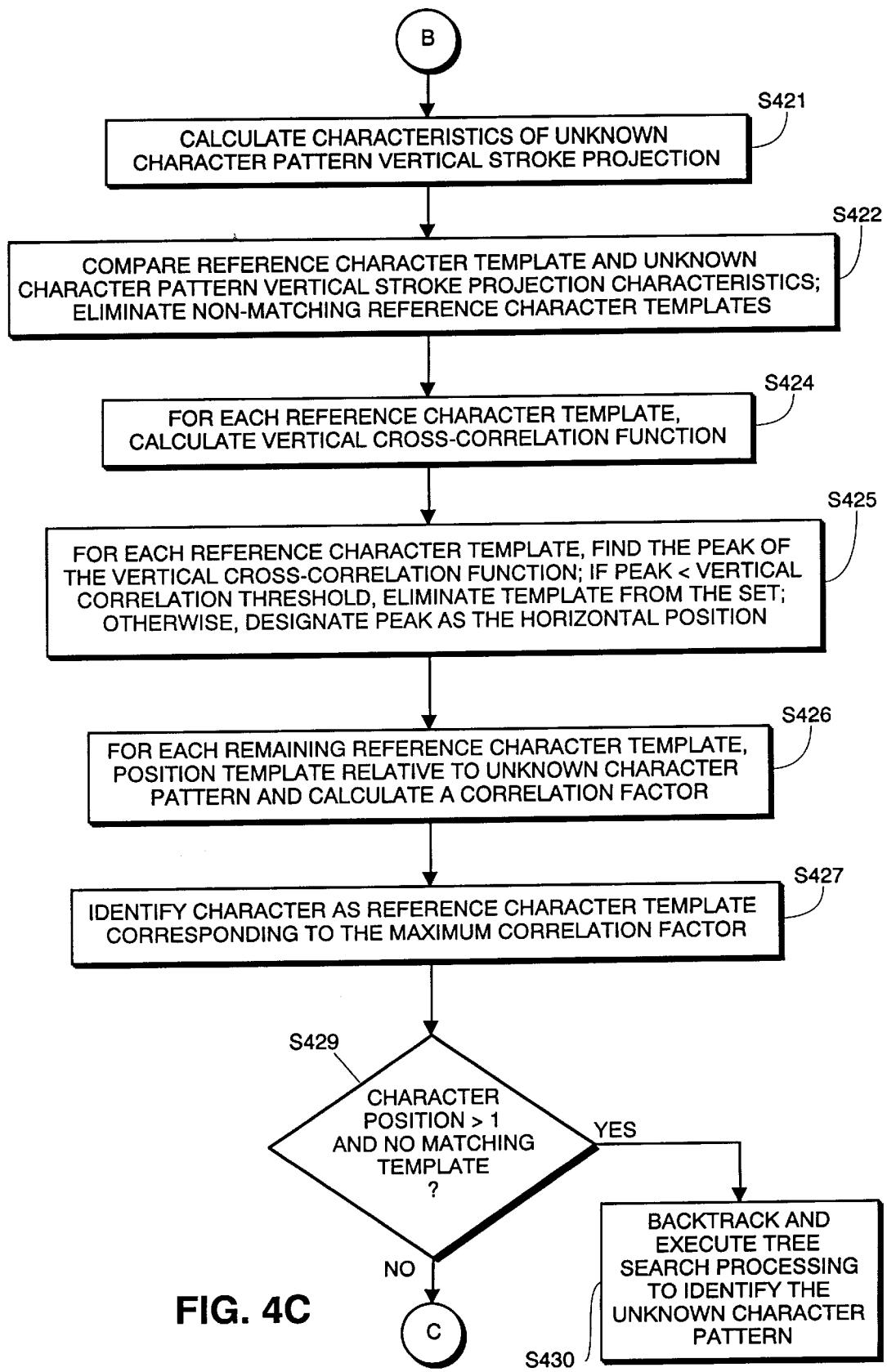
Figure 4D:
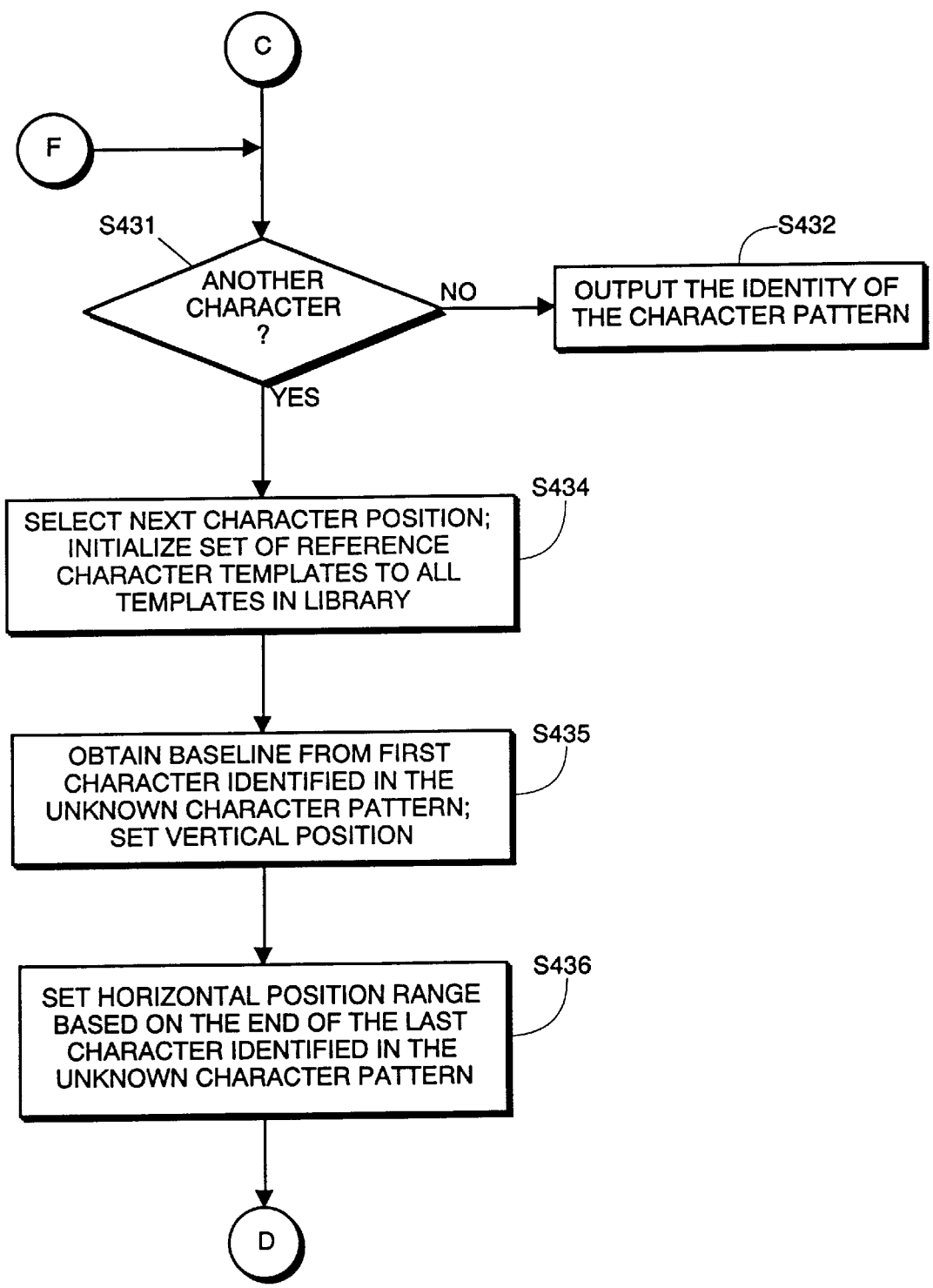

The structure of one representative embodiment of the invention is shown in FIGS. 3 and 4. The embodiment described here is a "personal imaging computer system", that is, a single stand-alone device that contains document scanning, storage and processing equipment which is connectable to a computerized local area network or wide area network. Equivalent general purpose components may be substituted for the equipment described herein. It is possible, for example, to substitute a general purpose programmable computer with suitable peripheral equipment.

Figure 1:
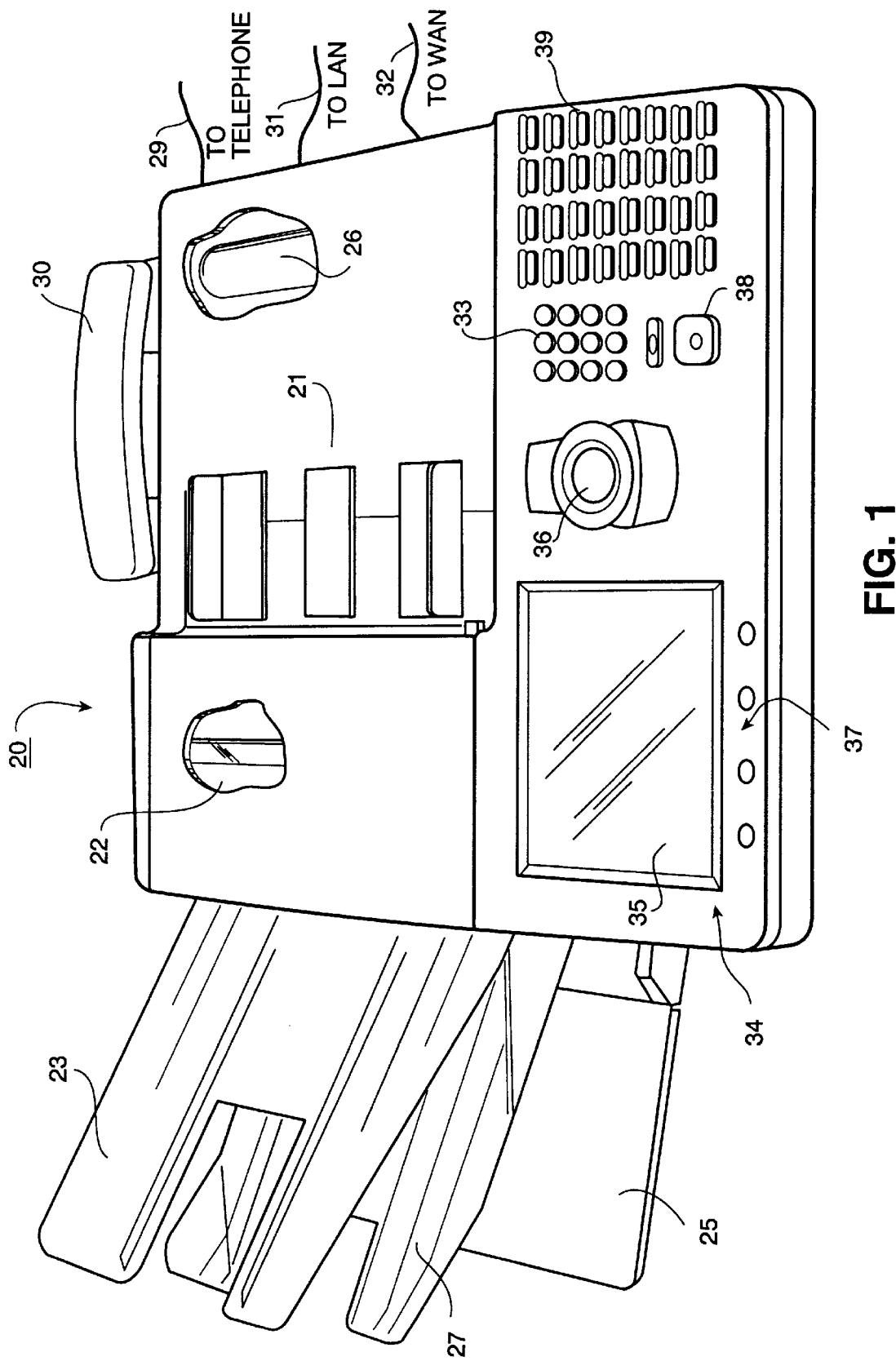
FIG. 1 is a partially cut-away view of the outward appearance of a personal imaging computer system according to the invention.

FIG. 1 is a partially cut away perspective view of the outward appearance of a personal imaging computer system ("PICS") that incorporates a gray-scale character recognition system according to the invention. As shown in FIG. 1, PICS equipment 20 includes, in one housing, a document feed section 21 upon which a stack of paper documents may be placed and from which the paper documents are fed one sheet at a time through a document scanner section 22. The document scanner section 22, which preferably includes a dual-side scanner, scans each document page using a CCD line-array to create a gray-scale image of the document. After scanning, the document pages are ejected to eject tray 23 upon which they are stacked. Blank document sheets in paper storage tray 25 (or in an unshown paper cartridge) are also fed by PICS equipment 20 past printer section 26 which forms and fixes toner images on the blank sheets and feeds the newly-printed documents to eject tray 27.

PICS equipment 20 further includes a facsimile/modem interface (shown in FIG. 2) by which PICS equipment 20 interfaces to an ordinary voice/data telephone line so as to engage in data and facsimile communication with remote computers and so as to permit an operator to engage in ordinary voice communication via telephone handset 30. Interfaces are also provided to a local area network 31 and a wide area network 32 so as to allow communication with users on remote workstations via such networks.

Operator controls and displays are provided at control panel 34. Control panel 34 includes a flat panel display screen 35 such as a VGA liquid crystal display panel. A trackball 36 is provided so as to permit an operator to manipulate a cursor displayed on display screen 35 and so as to permit an operator to select objects on the display screen. An ordinary telephone keypad is provided at 33, conventional facsimile control buttons are provided at 37, and start/stop buttons are provided at 38. Programmable function keys are provided at 39 so as to permit an operator to control various image processing operations of PICS equipment 20.

PICS equipment 20 includes a general purpose computer (described in further detail in FIG. 2) whereby an operator is able to scan in documents, segmentation-process and recognition-process the documents to create text files corresponding to text areas in the documents, print out document images, manipulate document images and text files via trackball 36 and display screen 35, and send and receive documents and images via facsimile.

Figure 2:
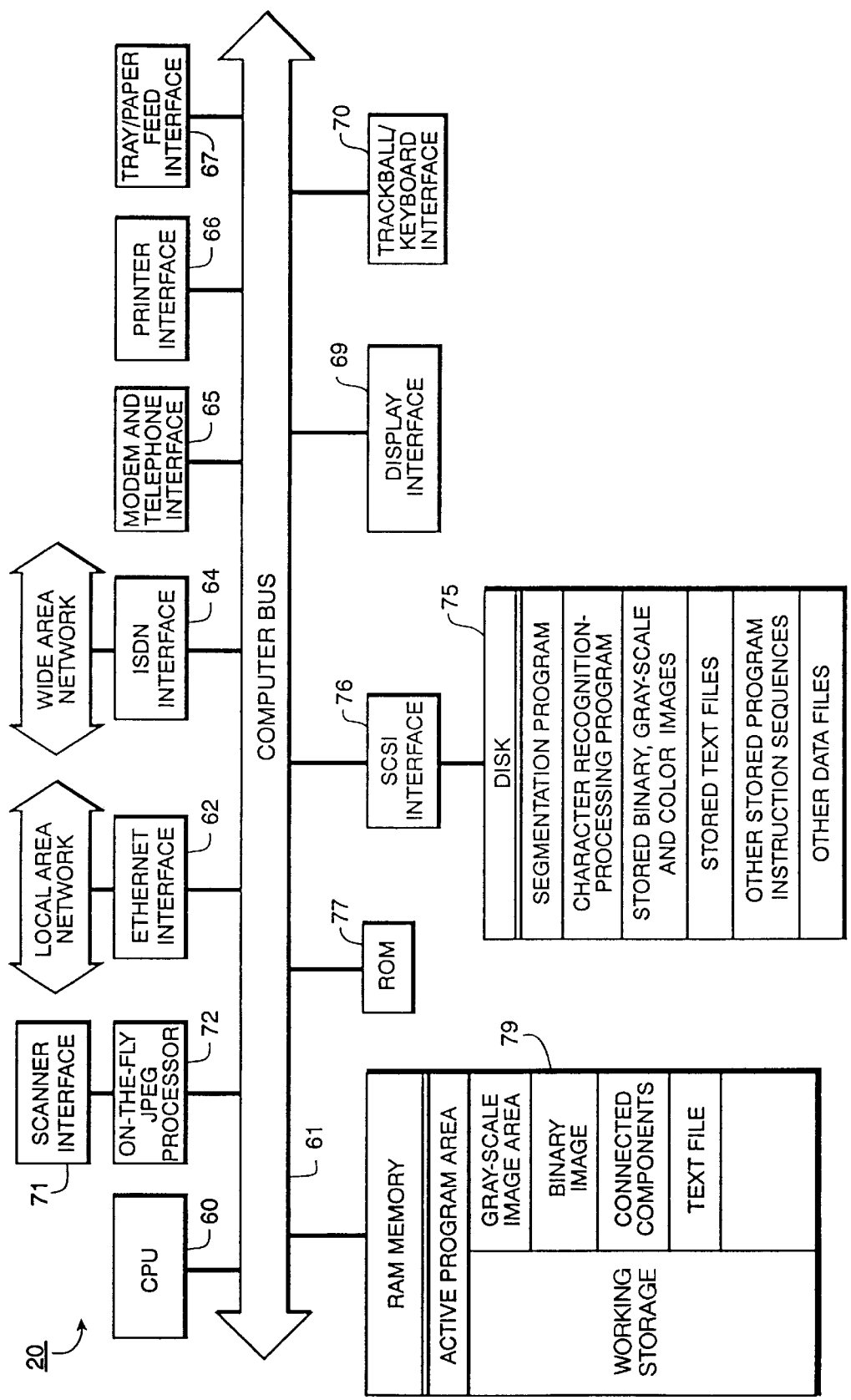
FIG. 2 is a detailed block diagram of the internal construction of the FIG. 1 apparatus.

FIG. 2 is a detailed block diagram showing the internal construction and connections of the presently preferred embodiment of PICS equipment 20 in accordance with the invention. As shown in FIG. 2, PICS equipment 20 includes central processing unit ("CPU") 60 such as an Intel Pentium or reduced instruction set computer ("RISC") interfaced to computer bus 61. Also interfaced to computer bus 61 is Ethernet interface 62 for interfacing to local area network 31, ISDN interface 64 for interfacing to wide area network 32, modem/facsimile/voice telephone interface 65 for providing appropriate modem/facsimile/voice telephone interface to telephone line 29, printer interface 66 for interfacing to a printer, and tray/paper feed interface 67 for providing appropriate paper feeding commands for feeding out of document tray 21 past scanner 22 and to eject tray 23, and for feeding out of paper supply 25 past printer 26 and to eject tray 27.

A display interface 69 interfaces between display 35 and computer bus 61, and a trackball/keyboard interface 70 provides interface between computer bus 61 and trackball 36 and keys 39.

Computer bus 61 interfaces to scanner 22 via scanner interface 71 and an on-the-fly JPEG ("Joint Photographic Expert Group") processor 72. More particularly, as scanner 22 scans a document and the pixel data is collected by scanner interface 71, scanner interface 71 sends the pixel data to JPEG processor 72 so that the pixel data is compressed using JPEG compression. The compressed pixel data is provided to computer bus 61 thereby speeding operation of the device by providing on-the-fly JPEG compression as a document is being scanned.

In addition, JPEG processor 72 can be configured, via commands on bus 61, to decompress JPEG-compressed files into bit-map pixel data. The decompressed bit-map pixel data is then supplied through an unshown direct connection to print interface 66. By virtue of this arrangement, JPEG-compressed image files can be printed quickly and without the need for software decompression by reading the file out through JPEG processor 72 and thence directly to print interface 66, with binary thresholding, if desired.

Disk 75, such as a 1.2 gigabyte hard disk, interfaces to computer bus 71 via SCSI ("Small Computer Systems Interface") interface 76. On the disk are stored both data files, such as binary, gray-scale and color image data files and text data files, as well as stored program instruction sequences by which CPU 60 manipulates and creates those data files. In particular, disk 75 includes stored program instruction sequences which segmentation-process images of documents so as to distinguish between text and non-text regions of the document image and so as to extract individual character patterns from the text regions, and stored program instruction sequences which recognition-process images of characters (according to the methods shown in FIG. 4 and described in detail below) so as to determine the identity of the characters.

Read only memory ("ROM") 77 interfaces with computer bus 61 so as to provide CPU 60 with specialized and invariant functions such as start up programs or BIOS programs. Main random access memory ("RAM") 79 provides CPU 60 with memory storage both for data and for instruction sequences, as required. In particular, when executing stored program instruction sequences such as segmentation programs or character recognition programs, CPU 60 normally loads those instruction sequences from disk 75 (or, in the case of network access, from other program storage media) to RAM 79 and executes those stored program instruction sequences out of RAM. Working storage areas for data manipulation are also provided in RAM and, as shown in FIG. 2, include working storage areas for gray-scale images, binary images, connected components and text files.

Operation of the above-described representative embodiment of the invention will now be described. In general, in accordance with operator instructions—which are usually received via keyboard/trackball interface 70 but which also may be received from other sources such as via the local area network 31 or wide area network 32 or via telephone line 29 by modem or DTMF commands—stored application programs are selected and activated so as to permit processing and manipulation of data. For example, any of a variety of application programs such as segmentation processing programs, recognition processing programs, word processing programs, image editing programs, spreadsheet programs and similar information processing programs, may be provided for operator selection and use. Thus, an optical character recognition-processing program may be activated whereby a document on document tray 21 is fed past scanner 22 so as to scan the document and create an image of the document. Preferably, the resolution at which the document is scanned is suitable for recognition processing, such as 400 dpi. On-the-fly JPEG processor 72 compresses the image as it is scanned in, and the compressed image is stored in RAM 79. The gray-scale image is then segmentation-processed according to the stored program instructions, whereby text and non-text regions of the document are identified and individual character patterns from text regions are extracted. Thereafter, a recognition processing program recognition-processes the extracted character images, as shown in the flow diagram in FIG. 4 and described in detail below, and then stores them in a text file. The resulting text file may then be presented to the operator for review and/or manipulation with other application programs such as word processing programs, stored to disk 75, or transmitted over local area network 31, wide area network 32, or telephone line 29.

FIG. 3 summarizes a system for processing a scanned document, including optical character recognition processing, by which a text file is generated from a scanned document image. Briefly, according to FIG. 3, a gray-scale image of a scanned document is input, a binary image is generated from the gray-scale image by comparing the gray-scale image with a threshold, the binary image is segmented to isolate individual character patterns within the binary image and to determine certain characteristics of the individual character patterns, and gray-scale image information is extracted for each individual character pattern from the gray-scale image using the location and shape of the character pattern in the binary image as a template. Each extracted gray-scale character pattern is then recognition-processed to determine the identity of the character(s) in the character pattern, and the identities of the characters are stored.

At step S301 in FIG. 3, a gray-scale image of a document is input. At step S302, the scanned-in image is de-skewed. Image skew can result from improper scanning of the document such as by feeding the document crookedly past scanner 22, or it can result from scanning a document which is a mis-oriented copy of some other original document. Whatever its source, skew can cause errors in character recognition, so the image's skew is removed at step S302. In this regard, it is possible to store the skew corrections that are made in step S302 so that the skew corrections can be "un-done" after recognition-processing of the image and in preparation for image storage, but ordinarily the skewed image is simply discarded and only the de-skewed image is retained.

At step S303, a copy of the gray-scale image is preserved in RAM 79 so that gray-scale character pattern images may later be extracted from it for recognition processing (see steps S307 and S308).

At step S304, a binary image is derived from the gray-scale image by comparing the gray-scale image with a threshold. The binary image so obtained is stored in RAM 79.

At step S305, the binary image is segmentation-processed to distinguish between text and non-text areas of the document and to locate individual character patterns within text areas of the document. Briefly, segmentation processing involves underline removal, isolation of "connected components" (defined as a group of connected black pixels surrounded everywhere by white pixels), determination of certain attributes for each connected component, and based on such attributes, determination of whether each connected component is text or non-text. Finally, additional processing is performed on those connected components identified as text (e.g., rejoining the dot and the main body of a lower case "i" which were separated in the connected component analysis) in order to form whole character patterns. Of particular importance, in the case of characters in the scanned document image that for various reasons touch each other, the segmentation processing might isolate a character pattern consisting of more than a single character.

In step S306, character pattern templates are created based on the location and shape of the character patterns within the binary image.

In step S307, gray-scale character pattern images are extracted from the gray-scale image stored in step S303 using the templates derived in step S306. The extracted gray-scale character pattern images are then recognition-processed in step S308 (which step is described in more detail below) so as to identify each individual character in text areas of the document.

In step S309, the character identities are stored in a computer readable text file such as in ASCII format. Page reconstruction is undertaken so that the reading order of the text file accurately reflects the reading order in the original document. For example, in the case of an original document, such as a newspaper, where the text is formatted in two columns, it will be appreciated that a line of text in the left hand column should not be followed by a corresponding line of text in the right hand column. Rather, all lines of text in the left hand column should be followed by all lines of text in the right hand column. Step S309 accomplishes this page reconstruction so as to obtain correct reading order for the text file.

In step S310, the text file is output, such as by outputting to disk 75 or to a network disk. As noted above, the text file is often stored in association with its document file so as to assist in retrieving the document.

Other than recognition processing (i.e., step S308) which is discussed in detail below, a detailed discussion regarding implementation of the steps shown in FIG. 3 and discussed above is set forth in commonly-assigned application Ser. No. 08/228,418 filed Apr. 15, 1994, "Image Processing System With On-The-Fly JPEG Compression", the contents of which are incorporated herein by reference as if set forth in full.

Recognition processing will now be discussed with reference to FIG. 4. FIG. 4 is a flow diagram showing recognition processing (i.e., step S308 in FIG. 3) of an unknown character pattern according to the invention.

As described above, when an unknown character pattern is received for recognition processing, it might consist of a single character or multiple touching characters. The first step in identifying a character within the pattern is to position a reference character template in order to align it as closely as possible with the unknown character pattern. Because the entire document has already been de-skewed in step S302, the character pattern should already be rotationally aligned with the reference character template, and therefore the template only has to be vertically and horizontally translated to the correct position in order to properly align it with the unknown character pattern. When properly positioned, a correlation factor between the reference character template and the unknown character pattern is calculated. Such positioning and calculation of a correlation factor are repeated for multiple reference character templates, and then a character in the unknown character pattern is identified as the template corresponding to the largest correlation factor.

Briefly, according to FIG. 4, the unknown character pattern is input, scaled to match the template character sizes, and horizontal and vertical stroke projections are calculated for the unknown character pattern. Such horizontal stroke projection is then compared against a corresponding horizontal stroke projection for each reference character template at various relative vertical positions by calculating a horizontal correlation function between the two horizontal stroke projections. Similarly, vertical stroke projections for the unknown character pattern and each reference character template are compared at various relative horizontal positions by calculating a vertical correlation function for each reference character template. Each reference character template is positioned with respect to the unknown character pattern at the horizontal position corresponding to the peak in its vertical correlation function and at the vertical position corresponding to the peak in its horizontal correlation function. A two dimensional correlation coefficient is then calculated between each reference character template and the unknown character pattern. The character is then identified according to the highest correlation coefficient so obtained. In certain cases, the character identity can be obtained based solely on characteristics of the horizontal and vertical stroke projection of the unknown character pattern.

In the event the unknown character pattern contains multiple characters, an attempt is made to identify each character independently. If it becomes impossible to identify one of the characters in the unknown character pattern in that manner, the foregoing process is terminated and the characters in the unknown character pattern are identified by using tree search processing to identify all possible potentially matching character strings. The unknown character pattern is then identified in accordance with the potentially matching character string having the highest average correlation coefficient.

In more detail, at step S401 a library of character templates and related characteristics is obtained. In this regard, there may be several available libraries of character templates in storage, corresponding to different font types (e.g., Courier or Helvetica) and font styles (plain or italics) and whether the unknown character pattern is stored in binary or gray-scale format. The library (or the library selected in accordance with the text characteristics, if more than one library is stored) is obtained such as by loading the selected library into RAM memory 79 from disk 75.

Each character template in the library is stored at a fixed size, preferably 10 point, and either has a common baseline with the other character templates or is stored along with its baseline position. Also stored along with each character template and obtained in this step are various other template characteristics, such as horizontal stroke projection, vertical stroke projection, vertical projection, centroid, location of initial peak, and various characteristics of the horizontal and vertical projections, the necessity of which will become apparent below.

In step S402, the unknown character pattern is input. As mentioned above, the unknown character pattern may consist of a single character or multiple characters.

In step S404, the unknown character pattern is linearly scaled to the same size as the character templates (i.e., 10 point in the preferred embodiment). This step helps insure that comparisons between the unknown character pattern and the character templates will be meaningful.

Figure 5A:
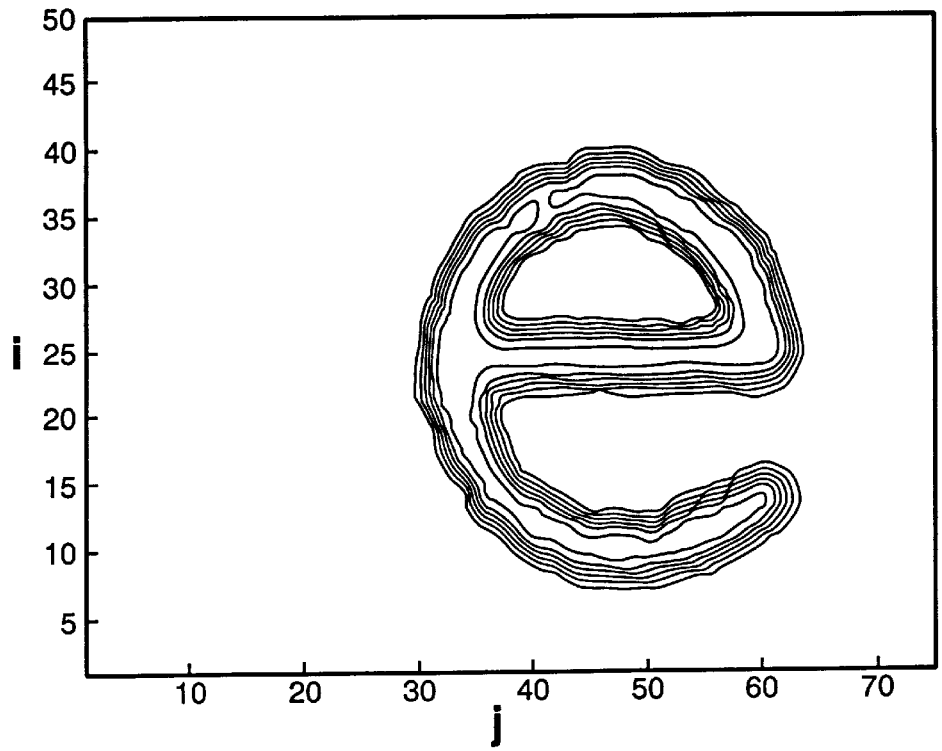
FIGS. 5A and 5B illustrate a horizontal cross-section projection for the letter "e".
Figure 5B:
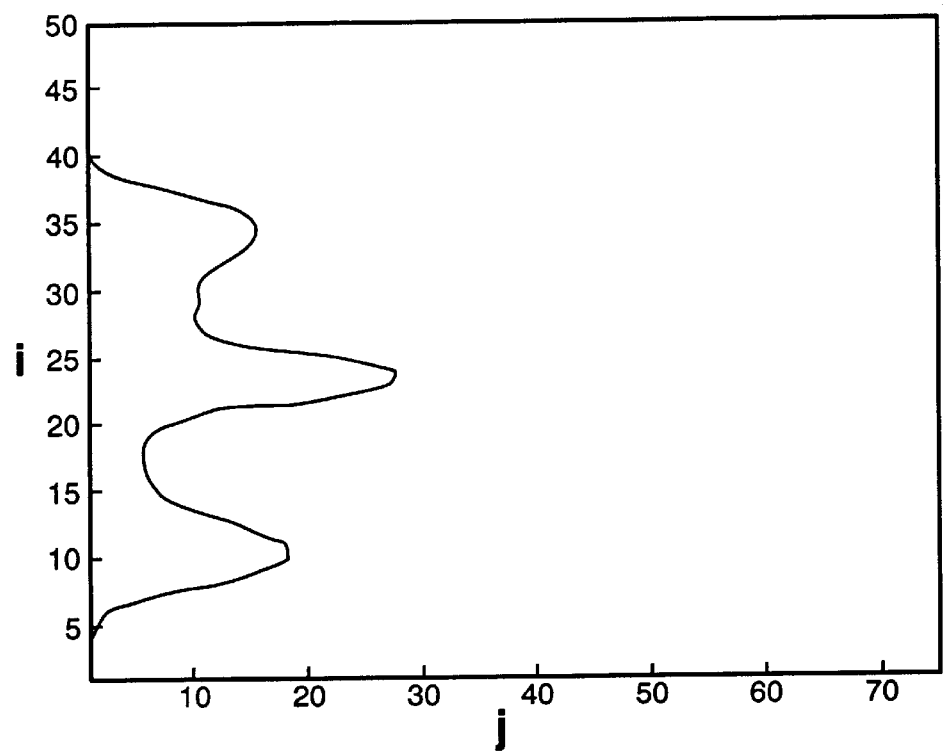

In step S405, a horizontal projection of the unknown character pattern is calculated. The horizontal projection is used in determining the vertical position of an unknown character template with respect to the unknown character pattern. A variety of horizontal projection techniques may be used. For example, a classical cross-section projection, given by:

$$\text{horizontal cross-section}(i) = \sum_j \text{Unknown}(i, j)$$

where i represents the pixel position in the vertical axis and j represents the pixel position in the horizontal axis, may be used. Graphically, the horizontal cross-section projection represents, for each vertical position, the sum of the character pattern pixel intensities along a horizontal line at that vertical position. An example of the horizontal cross-section projection for the gray scale image of the letter "e", a two-dimensional representation of which is depicted in FIG. 5A, is shown in FIG. 5B.

Figure 6A:
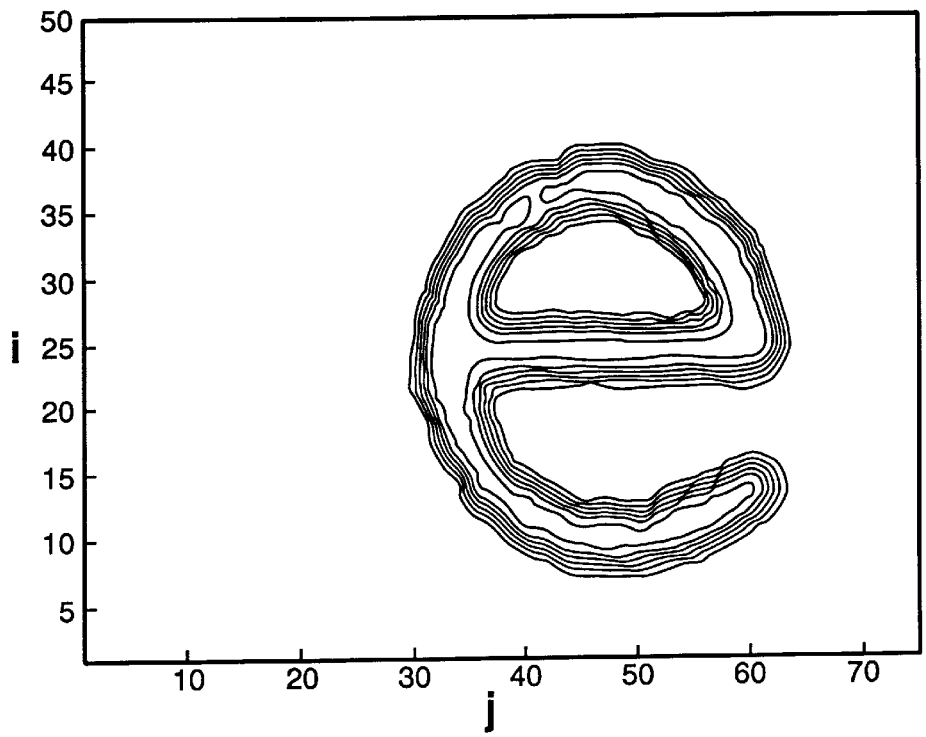
FIGS. 6A and 6B illustrate a left edge projection for the letter "e".
Figure 6B:
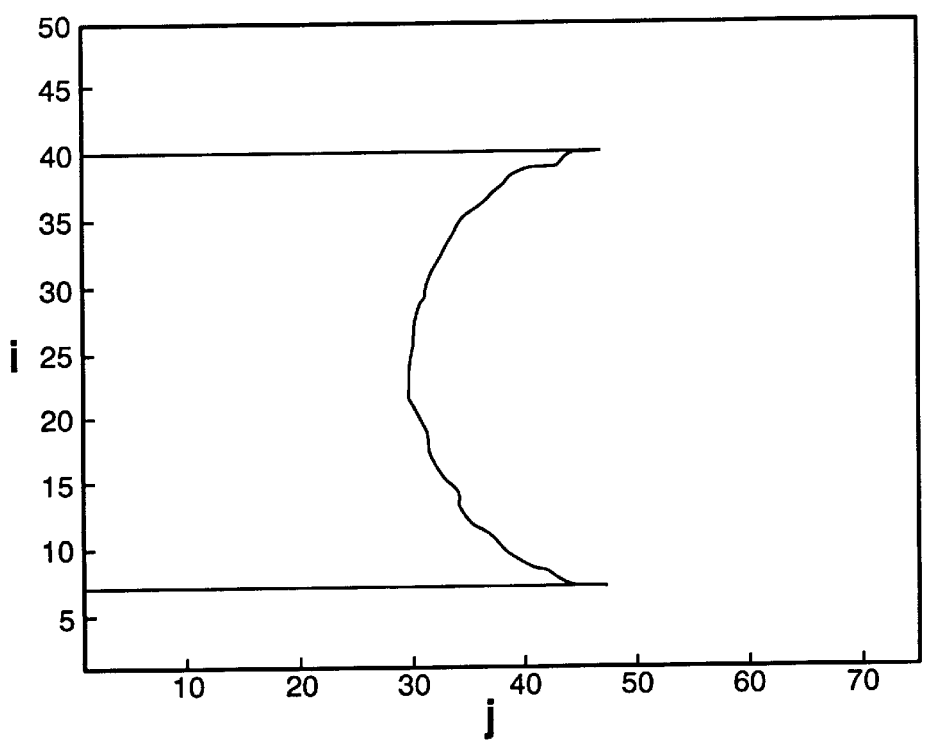

Alternatively, a technique that essentially traces a side of the character may be used. For example, a left edge projection technique plots the distances from a vertical line to the first pixel encountered having a specified threshold intensity. An example of the left edge projection technique for the letter "e" in FIG. 6A is shown in FIG. 6B.

Figure 7:
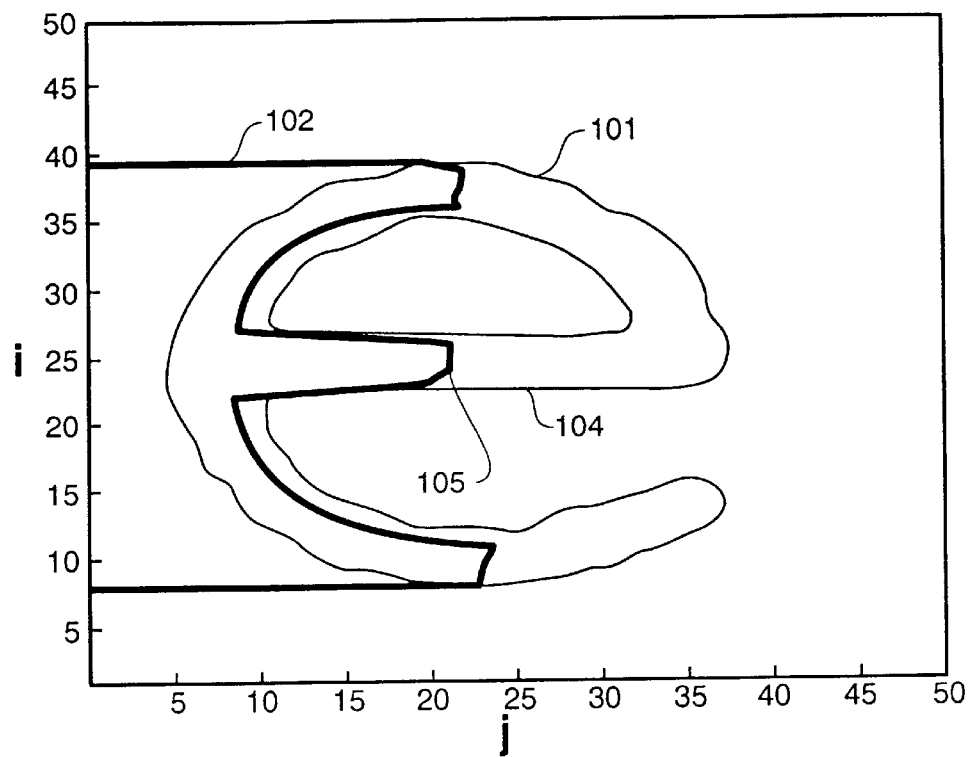
FIG. 7 illustrates a horizontal left stroke projection for the letter "e".

However, in the preferred embodiment, the horizontal projection is a left stroke projection, defined for each vertical position as the weighted midpoint of the first white-black-white region encountered when traversing the character pattern from left to right. In the preferred embodiment, the formula for the horizontal stroke projection is:

$$\text{horizontal stroke projection}(i) = \frac{\sum_j j * \text{Unknown}^2(i, j)}{\sum_j \text{Unknown}^2(i, j)}$$

where the summations are performed over j only for the first white-black-white region of the unknown character pattern encountered from the left. FIG. 7 illustrates the left stroke projection 102 for character 101 which is the letter "e". The left stroke projection technique can produce a projection that reflects portions of a character that include more than one of what is commonly thought of as a "stroke." Thus, as shown in FIG. 7, although the horizontal stroke projection 102 for character 101 mostly traces the left side of character 101, the straight horizontal "stroke" 104 of character 101 produces the middle peak 105 in horizontal stroke projection 102.

Figure 8:
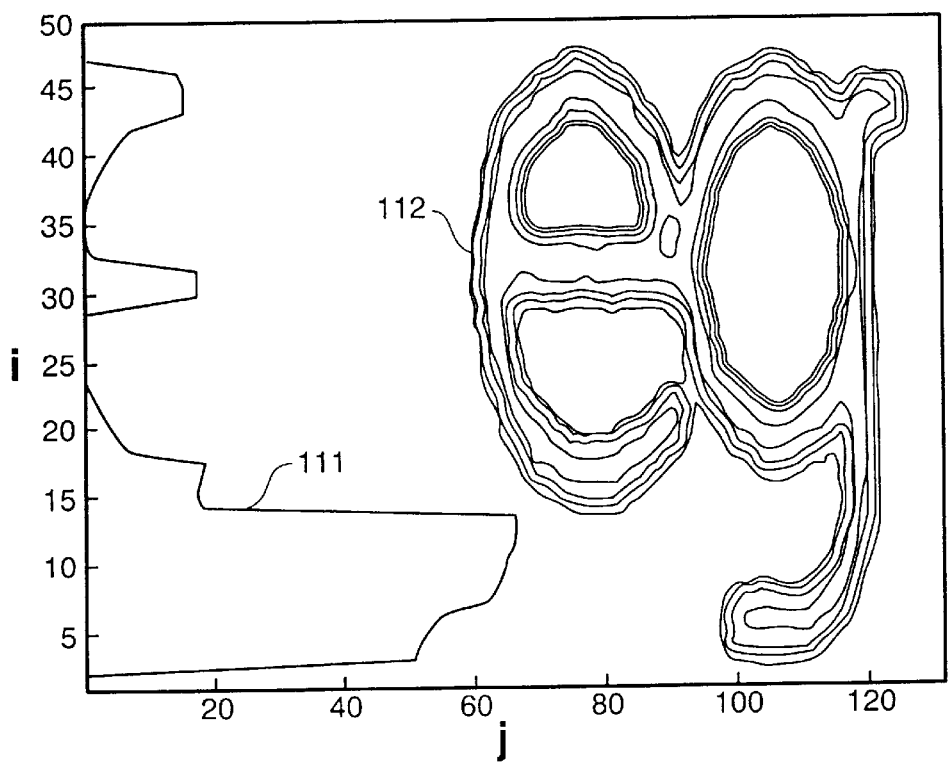
FIG. 8 is a graph of a horizontal left stroke projection of a touching character pattern "eg".

Whichever projection technique is used, it is preferable to ignore pixel data occurring after a certain number of pixels, preferably the maximum character template pixel width (typically 40 pixels), from the left hand side of the unknown character pattern. In this manner, the influence of any second and subsequent characters in the unknown character pattern on the horizontal projection can be avoided. For example, FIG. 8 shows the left stroke projection 111 (with bias removed, as discussed below) for the "eg" touching character pattern 112. By restricting the calculation to the first 40 character pixels encountered, most of the projection corresponding to the portion of the "g" extending below the bottom of the "e" would be eliminated, resulting in a more accurate projection for the "e", which is the character that the recognition processing system initially attempts to identify.

In step S406, bias is eliminated from the horizontal stroke projection by subtracting the horizontal stroke projection minimum value from it, resulting in a minimum horizontal stroke projection of zero, as shown in FIG. 8. This normalizes the unknown character pattern horizontal stroke projection with the horizontal stroke projection for the character templates, which have been pre-computed to have a minimum value of zero. In addition, the elimination of bias in this manner acts as a form of rough horizontal positioning for the unknown character template. Therefore, in step S406 a horizontal positioning range, preferably 3 pixels wide, based on the horizontal stroke projection minimum value is also calculated.

In step S407, characteristics of the horizontal stroke projection for the unknown character pattern are determined. These characteristics can be used for a variety of purposes to reduce the required processing, and may include, for example, the number of strong (i.e., relatively high and narrow) peaks in the horizontal stroke projection, the height, width or location of one or more of the peaks, or the length of the non-zero portion of the horizontal stroke projection.

Figure 9:
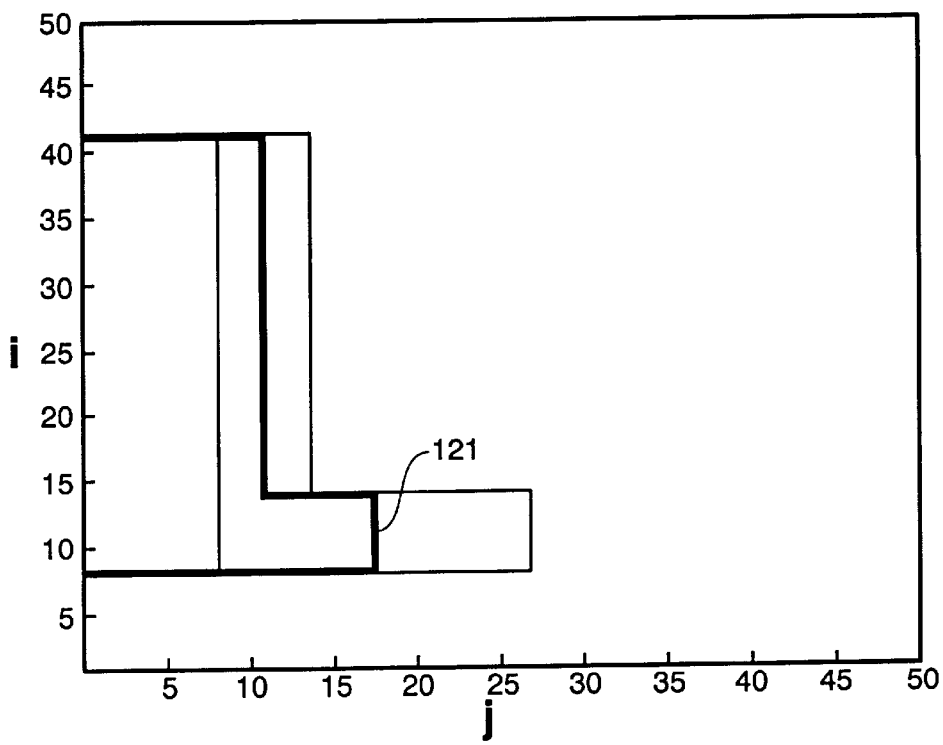
FIG. 9 illustrates the left stroke projection for the letter "L".
Figure 10:
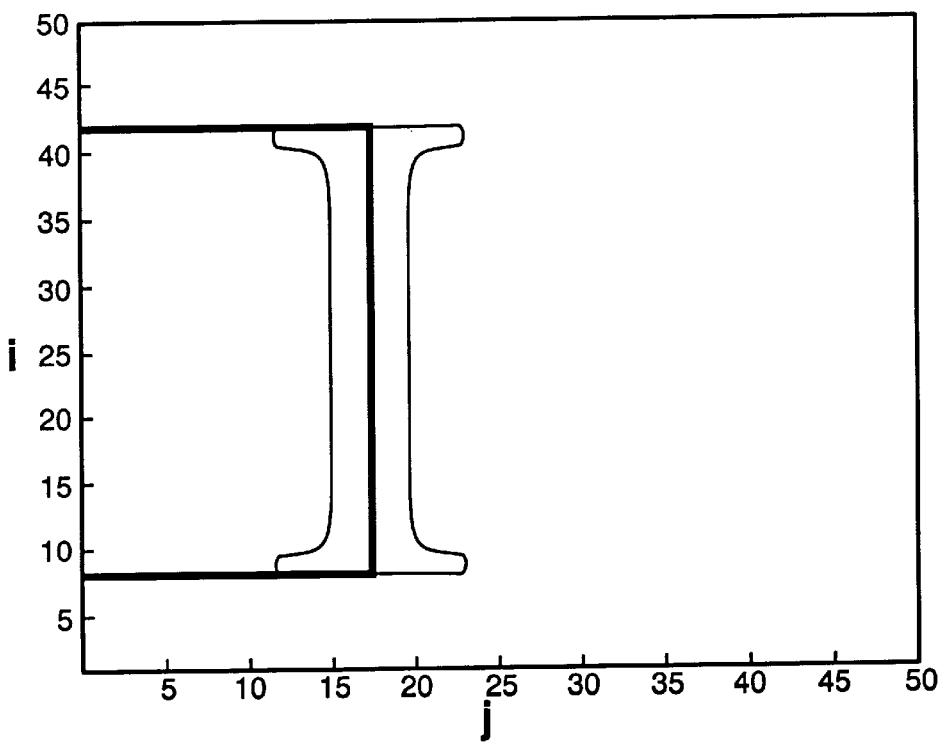
FIG. 10 illustrates the left stroke projection for the letter "I".
Figure 11:
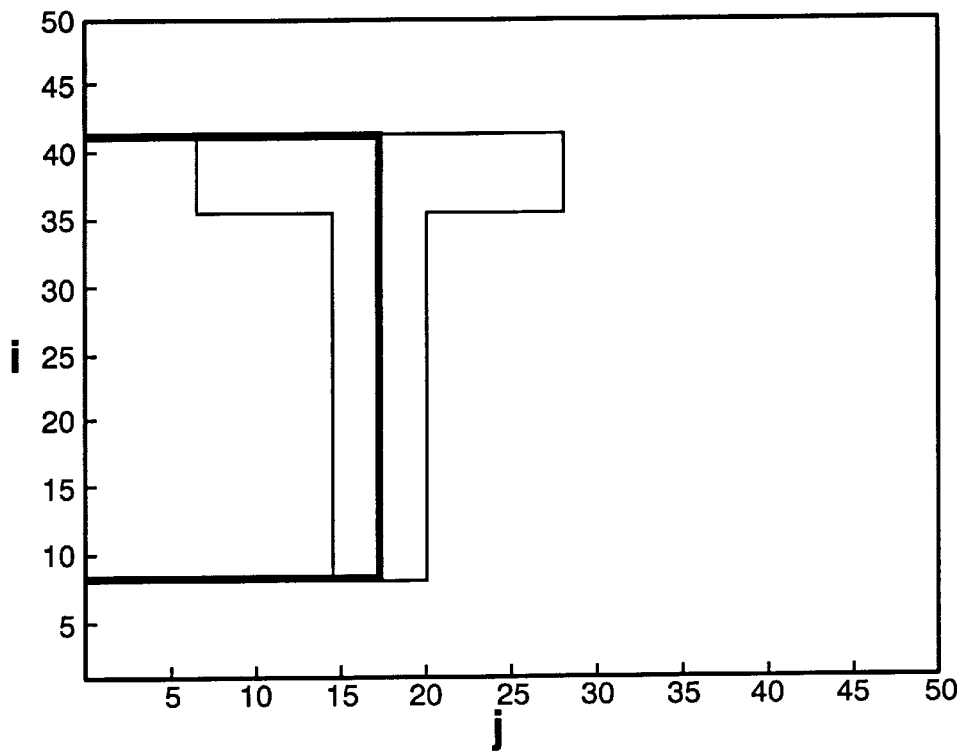
FIG. 11 illustrates the left stroke projection for the letter "T".

In step S409, the characteristics of the horizontal stroke projection determined in step S407 are used to select a set of potentially matching reference character templates. For example, a horizontal stroke projection with a strong bottom peak might indicate a "L" which, as shown in FIG. 9, has strong bottom peak 121, but cannot be an "I" or a "T" which, as shown in FIGS. 10 and 11, respectively, have relatively flat horizontal stroke projections. As a result, an unknown character pattern with a strong bottom peak need not be compared (by correlation as described below) with the templates for the characters "I" and "T", thereby reducing unnecessary processing.

In step S410, based on the characteristics determined in step S407, the set of reference character templates selected in step S409, or both, a determination is made whether the identity of the character can be determined based solely on its vertical projection, eliminating the need to perform one dimensional and two dimensional cross-correlations. For example, if the determined horizontal stroke projection characteristics indicate that the unknown character must be either a "V" a "\" or a "W", the identity of the character might be identified solely on the basis of its vertical projection.

If the unknown character can be identified based solely on its vertical projection, steps S440 through S443 are performed. In step S440, a vertical projection for the unknown character pattern is calculated. As with the horizontal projection, a number of vertical projection techniques are available, including analogues to all of the examples of horizontal projection given above. However, in this step in the preferred embodiment, the vertical projection given by:

$$\text{vertical projection}(j) = \sum_i \text{Unknown}(i, j)$$

(which is recognized as a vertical cross-section projection) is used. In step S441, characteristics of the vertical projection for the unknown character are determined. Once again, examples of such characteristics include the number of strong peaks in the vertical cross-section projection, the height, width or location of one or more of the peaks, or the length of the non-zero portion of the vertical cross-section projection. In step S401, similar characteristics for the reference character templates were obtained. In step S442, the unknown character pattern and reference character template vertical projection characteristics are compared to determine the identity of the unknown character, after which processing resumes at step S431.

In the event that the determination in step S410 was negative, then at step S411, the vertical position of each reference character template with respect to the unknown character pattern is determined. In step S411, the first reference character template in the set (formed in step S409) is selected. In step S412, the characteristic indicating whether the unknown character pattern has a strong peak is checked. If it does have a strong peak, then no correlation need be performed, and in step S414 the vertical position is determined simply by comparing the locations of the initial peaks in the unknown character pattern and the reference character pattern (no reference character templates without a strong peak will have been included in the set formed at step S409).

If no strong peak exists, in step S415 a horizontal cross-correlation function is calculated between the horizontal stroke projections for the unknown character pattern and the reference character template, in accordance with the following formula:

$$\text{horizontal-corr}(i) = $$

-continued $$\frac{\sum_{i'} \text{Ref-HSP}(i' - i) * \text{Unknown-HSP}(i')}{\sqrt{\sum_{i'} \text{Ref-HSP}^2(i' - i) * \sum_{i'} \text{Unknown-HSP}^2(i')}}$$

where Ref-HSP is the reference character template horizontal stroke projection, Unknown-HSP is the unknown character pattern horizontal stroke projection, and i is the required vertical translation in pixels of the reference character template. The horizontal correlation function indicates the degree to which the reference character template horizontal stroke projection matches the unknown character pattern horizontal stroke projection at various vertical positions relative to each other.

Figure 12:
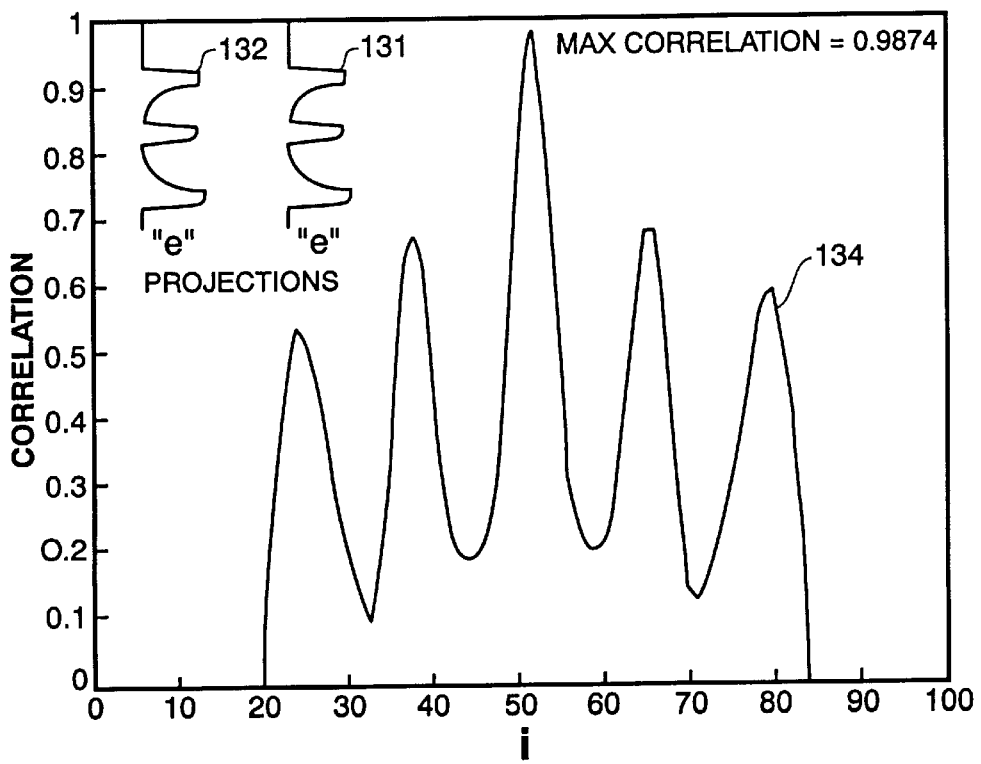
FIG. 12 is a graph of a horizontal cross-correlation function between a character pattern "e" and a template character "e".

An example of a horizontal stroke projection is illustrated in FIG. 12 for the character "e" shown in FIG. 7. As shown in FIG. 12, inset 131 illustrates the shape of the horizontal stroke projection 102 for character 101 in FIG. 7. Inset 132 illustrates the shape of the horizontal stroke projection for a reference character template "e", which in this case is identical to the shape of the horizontal stroke projection for the unknown character pattern.

Each point on horizontal correlation function curve 134 indicates the correlation factor between the two horizontal stroke projections at a different vertical position relative to each other. When the two are as closely aligned as possible a peak correlation results, in this case 0.9874. As the projection illustrated by inset 132 moves up or down relative to inset 131 (corresponding to vertical positioning of the template), the two become less perfectly aligned resulting in less than maximum correlation. Local peaks in the horizontal correlation function indicate points at which one or two of the peaks for the horizontal stroke projection for the reference character template align with peaks in the projection for the unknown character pattern. Prior to approximately pixel 20 and after approximately pixel 85, no non-zero portion of the two projections align, and so the correlation function is zero at those points.

Rather than computing the horizontal correlation function for every possible vertical position, the values of i for which the function is calculated can be limited in the event that at least one previous character on the same text line has already been identified. In that case, using the baseline from the reference character templates used to identify the previously identified characters, together with the vertical positioning information used to position such templates with respect to the respective previously identified characters, a baseline is estimated for the present character, which is used to calculate a rough vertical position for the current character.

Furthermore, a centroid for the unknown character pattern optionally can be determined. The horizontal and vertical positions of the centroid are preferably determined as follows:

$$j_c = \frac{\sum_{i,j} j * \text{Unknown}^2(i, j)}{\sum_{i,j} \text{Unknown}^2(i, j)} \quad i_c = \frac{\sum_{i,j} i * \text{Unknown}^2(i, j)}{\sum_{i,j} \text{Unknown}^2(i, j)}$$

The unknown character pattern centroid then is compared with the centroid for the reference character template to obtain a rough vertical and a rough horizontal position. Consequently, the rough vertical position may be based entirely on the baseline estimate, entirely on the centroid comparison, or on a combination of the two. In any such event, the correlation function would only have to be calculated for values of i within a small window centered at the rough vertical position obtained.

Figure 13:
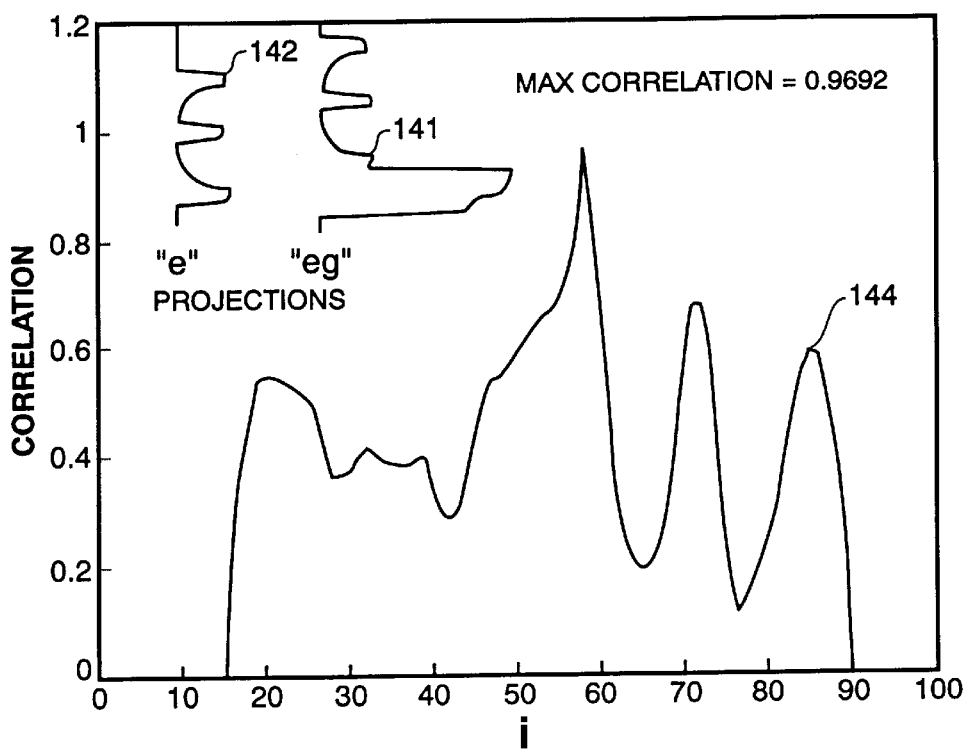
FIG. 13 is a graph of a horizontal cross-correlation function between a character pattern "eg" and a template character "e".
Figure 14:
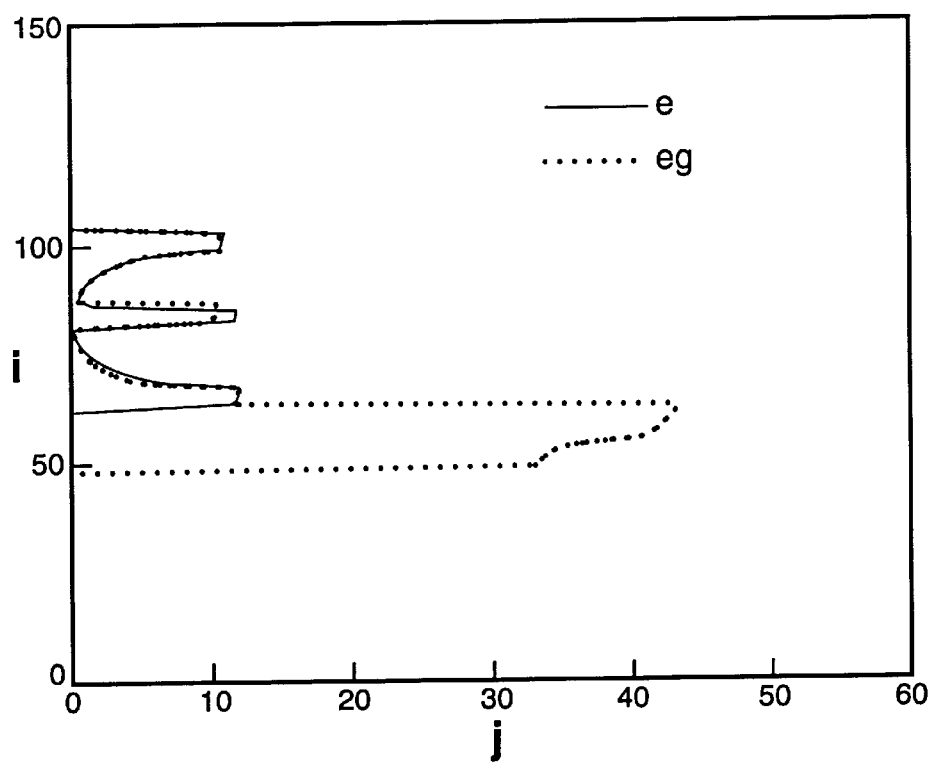
FIG. 14 is a graph of horizontal left stroke projections, aligned and superimposed, for a character pattern "eg" and a template character "e".

Furthermore, the horizontal correlation function is preferably only calculated for (i.e., the summations are only over) certain regions where the horizontal stroke projection for the reference character template is non-zero. By restricting the correlation function calculation to such non-zero regions, fewer computations are performed, and more importantly, the risk of interference from other touching characters is minimized. For example, FIG. 13 illustrates the horizontal correlation function 144 calculated between the horizontal projection of an unknown character pattern consisting of the touching characters "eg" having the shape shown in inset 141 (see FIG. 8) and the character template "e" having the shape shown in inset 142 (see FIG. 7). As can be seen, failure to so limit the correlation function calculation will result in a lower peak correlation value (0.9692 versus 0.9874 in FIG. 12) due to the portion of the "g" extending below the baseline. As seen in FIG. 14, even when the horizontal projection of the template "e" is perfectly aligned with the horizontal projection of the unknown "eg" pattern, the lower portion of the "g" will influence the correlation value. Although the correlation numerator is zero in that region, including that region in the calculation enlarges the denominator, resulting in the lower peak value and, potentially, a positioning error.

In step S416, the peak of the correlation function is found. If the peak is less than a specified threshold, the reference character template is an unlikely match and is therefore removed from the set, thereby reducing subsequent processing. Otherwise, the vertical position is set in accordance with the peak. The foregoing steps are then repeated to determine a vertical position for each reference character template in the set.

In step S420, a vertical projection for the unknown character pattern is calculated. Once again, a number of choices are available, including the projection examples given above. However, in the preferred embodiment, a vertical stroke projection, calculated as follows:

$$\text{vertical stroke projection}(j) = \frac{\sum_i i * \text{Unknown}^2(i, j)}{\sum_i \text{Unknown}^2(i, j)}$$

is used. Similar to the horizontal stroke projection, the summations are performed over i only for the first white-black-white region of the unknown character pattern encountered from the bottom of the unknown character pattern.

In step S421, characteristics, such as those calculated for the horizontal stroke projection in step S407, are calculated for the vertical stroke projection of the unknown character pattern.

In step S422, based on the characteristics determined in step S421, reference character templates are eliminated from set. For example, if the vertical stroke projection for the unknown character patten does not have a strong left peak, it cannot be an "E", "L" or "B".

In step S424, the vertical cross-correlation function between the vertical stroke projection for the unknown character pattern and the reference character template is calculated, according to the following formula:

$$\text{vertical-corr}(j) = \frac{\sum_{j'} \text{Ref-VSP}(j' - j) * \text{Unknown-VSP}(j')}{\sqrt{\sum_{j'} \text{Ref-VSP}^2(j' - j) * \sum_{j'} \text{Unknown-VSP}^2(j')}}$$

for each reference character template. Again, the range for which the function is calculated is limited. As discussed above, a horizontal positioning range is established for the first character in the unknown character pattern at step S406. As discussed below, a range is also set for subsequent characters, if any, in the pattern. Furthermore, the centroid-based rough horizontal position discussed above may be used instead of or in combination with those methods to determine a rough horizontal position. In any such event, the vertical cross-correlation function is only calculated for values of j within the range provided. Also similar to the horizontal correlation function calculation, in the preferred embodiment, the vertical correlation function is only calculated for non-zero regions of the vertical stroke projection for the reference character template.

In step S425, the peak of the vertical correlation function is found, and for each reference character template, if the peak is greater than a specified threshold, it is used to designate the horizontal position. Otherwise, the reference character template is deemed to be an unlikely match and is eliminated from the set.

In step S426, for each remaining reference character template, the template is positioned relative to the unknown character pattern based upon the horizontal and vertical positions determined, and a correlation factor is calculated between the reference character template and the unknown character pattern at that position, according to:

$$\text{correlation factor} = \frac{\sum_{i,j} \text{Ref}(i, j) * \text{Unknown}(i, j)}{\sqrt{\sum_{i,j} \text{Ref}^2(i, j) * \sum_{i,j} \text{Unknown}^2(i, j)}}$$

Figure 15:
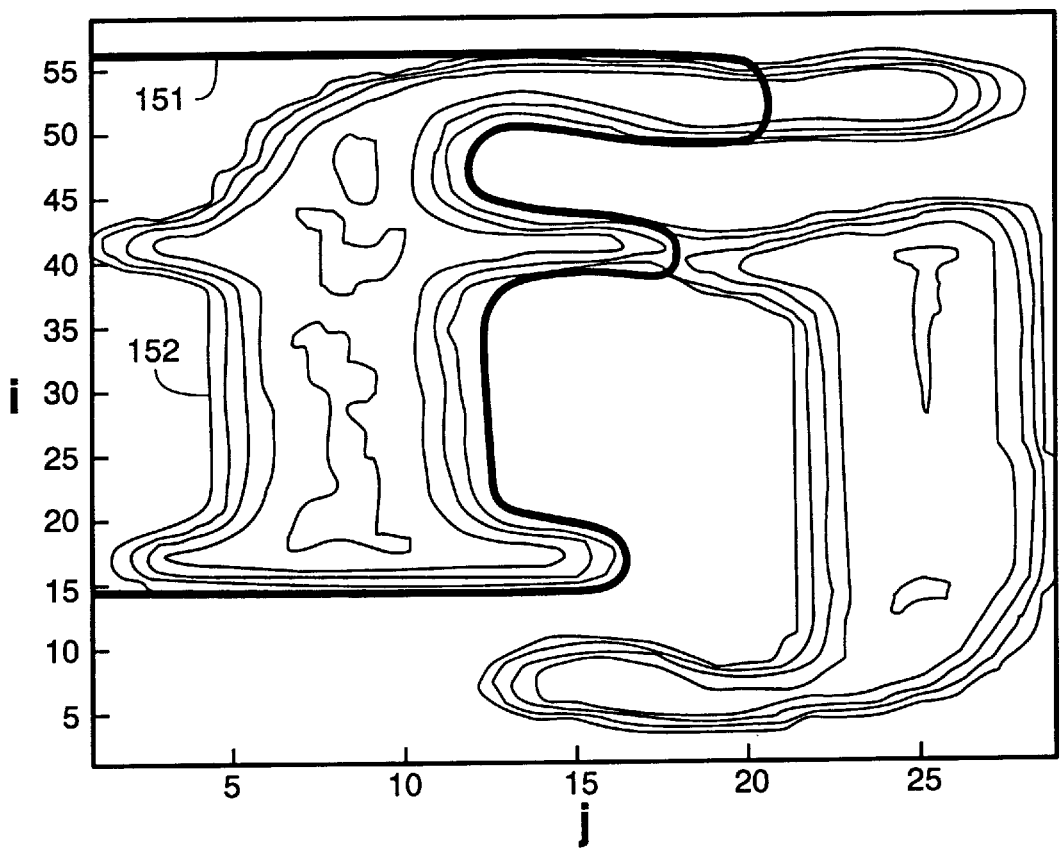
FIG. 15 illustrates a touching character pattern and the use of a non-rectangular template to identify a single character within the pattern.

In order to avoid the influence of any characters in the unknown character pattern other than the specific character which is currently being identified, the correlation factor is calculated so as to exclude certain regions in which the reference character pixel value is zero. The effect of so limiting the calculation is that, instead of using a rectangular template, the shape of the template more closely follows the contour of the reference character. An example of such a non-square template 151 for the reference letter "f", superimposed over the touching character pattern 152 (for touching characters "fj"), is shown in FIG. 15.

In step S427, the character is identified as the reference character template corresponding to the maximum correlation factor.

Next, if this is the second or subsequent character in the unknown character pattern and no matching template has been found for the current character position (i.e., all templates have been eliminated prior to step S426 or the maximum correlation factor determined is less than a specified threshold), step S429 ceases the current processing, and the identities of the characters in the unknown character pattern are determined in step S430 in accordance with tree search processing described in more detail below. Otherwise, processing continues to step S431.

In step S431, a determination is made as to whether there is another character in the unknown character pattern. In the preferred embodiment, the test used to make the determination is whether the width of the remainder of the unknown character pattern (i.e., from the end of the selected template for the current character position to the end of the unknown character pattern) is more than a fixed minimum number of pixels. If the determination is negative, then in step S432, the identities of the characters in the character pattern are output and processing ceases.

Figure 18B:
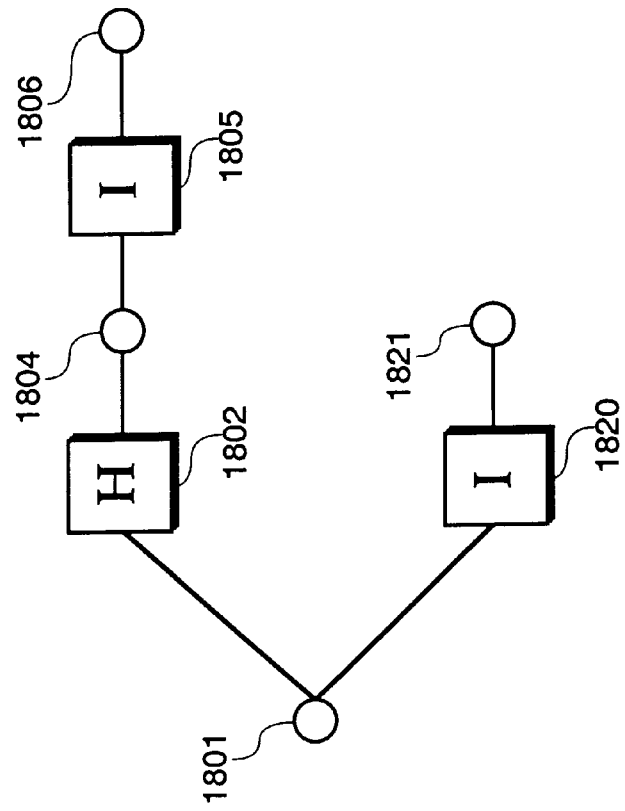
FIGS. 18A through 18F illustrate creation of the tree structure when tree search processing according to the invention is applied to the touching character pattern depicted in FIGS. 17A through 17D.

Otherwise, in step S434, the next character position is selected, and the set of reference character templates is initialized to all templates in the library. In step S435, the baseline from the character template corresponding to the identity of the first character in the unknown character pattern is obtained and the vertical position for the current character position is set in accordance with that baseline. In step S436, the far right pixel of the template used to identify the previous character in the character pattern is obtained, and the next horizontal pixel position is used as the center of an 11 pixel horizontal positioning range, which will be used in calculating the vertical cross-correlation function in step S424. For example, as shown in FIG. 18B, the template "H" as successfully positioned to identify the first character in the pattern, extends approximately to the 38th pixel. As a result, the horizontal positioning range for the left edge of each reference character template to be compared to the second character in the pattern is from pixels 34 to 44.

Thereafter, processing returns to step S420 to determine a horizontal position for each template (the vertical position already having been set), and select the best template for the current character position in the unknown character pattern.

The foregoing discussion describes recognition processing of an unknown character pattern by positioning, on a discrete pixel basis, a set of reference character templates with respect to the unknown character pattern. Modifications to that processing which permit positioning on a subpixel basis for greater positioning accuracy will now be discussed.

Although not strictly necessary, subpixel positioning is desirable to compensate for subpixel discrepancies between the positioning of the pixel grids for the reference character template and the unknown character pattern. Specifically, during scanning it is unlikely that the pixel grid will be exactly aligned (or only offset by an integer number of pixels) from one scan to another. For example, during one scan of a character, the scanner pixel grid might have one position relative to the scanned character, resulting in a certain gray-scale image. However, during a second scan of the same character, the scanning pixel grid might be shifted relative to the character, resulting in a second gray-scale image where the pixel values, especially those at the character edges, will be different from those in the first gray-scale image. Consequently, attempting to position the second gray-scale image with respect to the first by shifting the second gray-scale image by an integral number of pixels will never produce an exact match. Consequently, if the first scan is used as the reference character template and the second is used as the unknown character pattern, it is unlikely that any position will yield a correlation factor of exactly 1.000, even though the two original characters are in fact identical. As mentioned above, positioning errors of even a single pixel have been known to reduce the correlation factor by as much as 6%, raising the possibility of erroneous identification.

Various methods can be used to obtain subpixel positioning, including actually obtaining multiple templates (and corresponding template characteristics) for each reference character, with each such template corresponding to a different subpixel shift (such as every 0.2 pixel), calculating vertical and horizontal correlation functions for each shifted template for the reference character, selecting the peak of the correlation functions for the reference character, and based on the pixel position and particular template in which the peak occurs, determining the subpixel position.

However, in order to conserve storage and processing time, the preferred method is to use a parametric approach based on a linear interpolation between a first template for each reference character and a second template for the reference character, which second template is simply the first template shifted by one pixel. According to this method, a template, $T_i$, linearly interpolated between the first and second templates is given by:

$$T_i = \alpha * T + (1-\alpha) * T_s$$

where $\alpha$ ranges between zero and one, T is the first template and $T_s$ is the second template, that is, the shifted version of T. The correlation factor between $T_i$ and an unknown character pattern, U, is then given by:

$$\text{cor}(T_i, U) = \frac{\alpha * \text{cor}(T, U) + (1-\alpha) * \text{cor}(T_s, U)}{\sqrt{\alpha^2 + (1-\alpha)^2 + 2*\alpha*(1-\alpha)*\text{cor}(T, T_s)}}$$

The correlation factor between T and $T_s$ can be calculated and stored in advance, thereby requiring the calculation of only two two-dimensional correlations for each reference character. After calculating those correlation values, the above equation is evaluated using various values for a between 0 and 1 (e.g., 0.2, 0.4, 0.6 and 0.8), and the largest value obtained is assigned to be the correlation factor for the reference character.

A similar approach may be used to independently obtain vertical and horizontal subpixel resolutions, by using a parametric approach based on an interpolation between the reference character's stored stroke projection and the same projection shifted by one pixel. A reference template to be used in calculating the correlation factor is then generated by interpolating between the stored template and pixel shifted versions of the stored template.

Tree search processing which was identified in step S430 will now be discussed with reference to FIG. 16. Tree search processing is executed after a first attempt to identify multiple characters in an unknown character pattern by successively selecting the best matching template for each character position has failed (i.e., reached a character position which it cannot identify). Rather than independently selecting the best matching template for each character position, the processing according to FIG. 16 generates a first level set of potentially matching templates for the first character position, and then for each potentially matching template in that first level set, generates a second level set of templates that might match the second character position if such potentially matching template were actually in the first character position. The process continues for each character position, resulting in a tree-like structure containing all possible combinations of characters that might identify the unknown character pattern. Finally, when all combinations of characters have been generated, the best matching combination (defined in the preferred embodiment as the combination of characters having the highest average correlation factor with the unknown character pattern, as described below) is selected to identify the characters in the unknown character pattern. Consequently, instead of independently identifying each character, a best match is found for the unknown character pattern as a whole.

Figure 16:
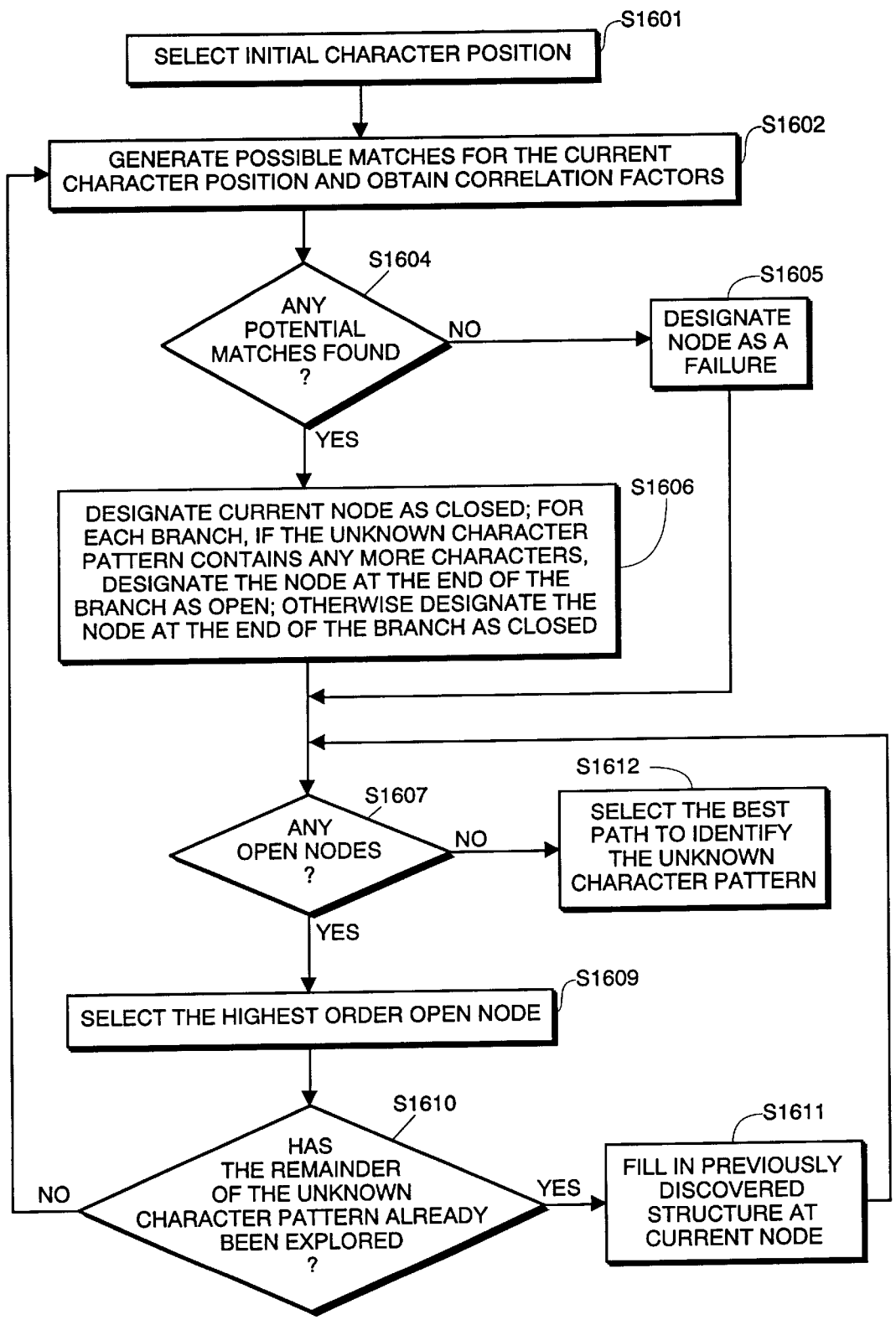
FIG. 16 is a flow diagram showing tree search processing according to the invention.

FIG. 16 is a flow diagram of the steps used in the tree search processing.

In step S1601, the first character position is selected. For purposes of this discussion, character positions are graphically represented by, and alternatively referred to as, nodes.

In step S1602, the possible matches for the current character position are generated and the correlation factors pertaining to each potential match are obtained. Each potentially matching template can be graphically represented by, and is alternatively referred to as, a branch, with each branch terminated by a node representing the next character position in the unknown character pattern. Briefly, step S1602 determines potential matches in a manner very similar to the processing shown in FIG. 4, but instead of selecting only the best candidate (i.e., the one corresponding to the highest correlation factor), all templates exceeding a minimum correlation are selected. A more detailed description of step S1602 is set forth below.

Next, step S1604 determines if any potential matches were found for the current node in step S1602. If no potential matching character templates were found in step S1602, then in step S1605 the current node is designated as a failure, and processing proceeds to step S1607. If any potential matches were found, processing proceeds to step S1606.

In step S1606, the current node is designated as "closed", indicating that no further processing with respect to that branch should be performed, and for each branch just generated, a determination is made whether the unknown character pattern contains any additional characters. If it does, the node at the end of the branch is designated as "open", indicating that additional processing with respect to that node is required. Otherwise, the node at the end of the branch is designated as closed. Whether any additional characters are present is determined in the preferred embodiment by comparing the pixel width of the remaining unknown character pattern to a fixed threshold.

In step S1607, a determination is made whether there are any open nodes. If there are, processing proceeds to step S1609.

In step S1609, the highest order open node is selected, or if more than one highest order open nodes exist, one of them is selected arbitrarily. For purposes of this discussion, the order of a node refers to the order of the character in the unknown character pattern that the node represents. By selecting the highest order open node, a path (corresponding to a potentially matching character string) is fully explored until it ends in failure or until the terminating node is designated as closed.

In step S1610, it is determined whether for the current node the remainder of the unknown character pattern has already been explored. This determination is made in the preferred embodiment based on whether any previously explored node corresponded to a portion of the unknown character pattern beginning approximately at the horizontal pixel location corresponding to the beginning of the character pattern represented by the current node, i.e., whether the two beginnings are within a fixed pixel distance from each other. If the remainder of the character pattern has not already been explored, processing returns to step S1602. If it has already been explored, in step S1611, the previously discovered structure (i.e., the structure generated when that portion was previously explored) is copied to the current node and processing returns to step S1607.

At some point during the processing, the determination in step S1607 is answered in the negative, indicating that all paths in the tree have been fully explored. Then, in step S1612, the generated paths are compared in order to identify the best one. If the tree only has one path, the characters in that path are selected as the identities of the characters in the unknown character pattern. If all paths except one end in failure, the characters in the path not ending in failure are output as the identity of the unknown character pattern. If there are two or more paths that do not end in failure, then: if the non-failure paths correspond to a special case (such as "rn" versus "m"), then rules specially tailored to the specific special case at issue are applied in order to empirically select the character identities; otherwise, the path is selected by comparing the correlation factors obtained in step S1602. With respect to the latter case, it is preferable to choose the branch corresponding to the highest average correlation factors for the characters in the path, although other techniques, such as highest average squared correlation factor, may be used instead.

Figure 17A:
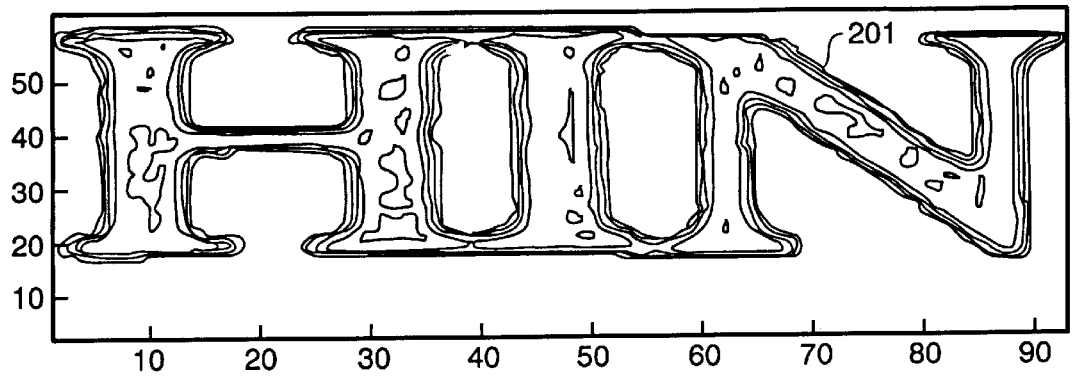
FIGS. 17A through 17B illustrate a touching character pattern and potentially matching templates for the first character aligned with and superimposed over the touching character pattern.

An example will now be given with reference to FIGS. 17A through 17D and 18A through 18F to illustrate how the processing shown in FIG. 16 and discussed above is applied in identifying the character pattern 201 illustrated in FIG. 17A.

Figure 17B:
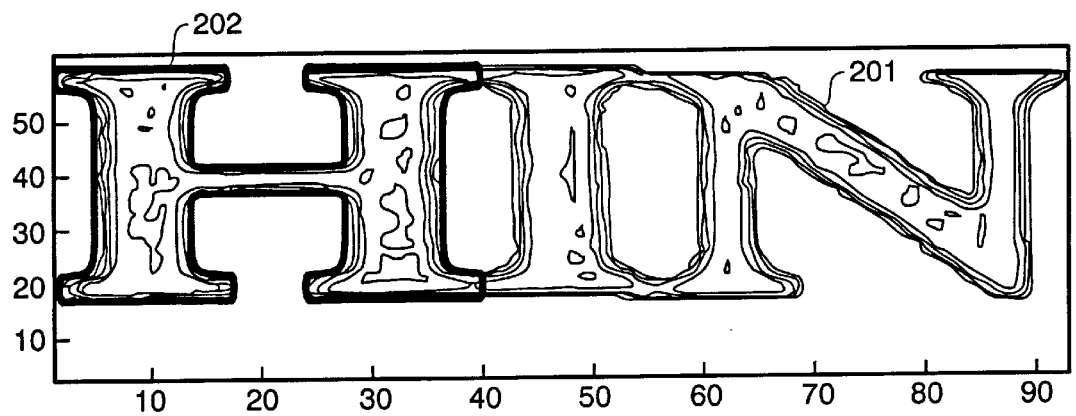
Figure 18A:
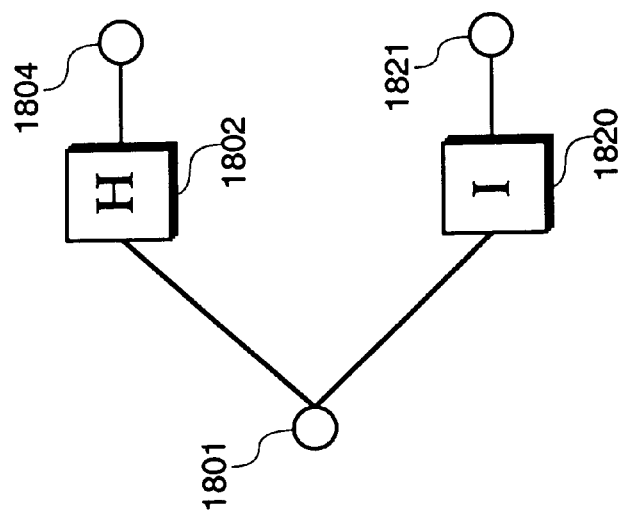

In step S1602, the initial position is identified as either "H" or "I". An "H" template 202 and an "I" template 204 are shown in FIGS. 17A and 17B, respectively, superimposed over character pattern 201 at the positions determined in step S1602. Thus, for the first character position, FIG. 18A shows branches 1802 and 1820, corresponding to letters "H" and "I", respectively, extending from initial node 1801. Also as shown in FIG. 18A, branches 1802 and 1820 end in nodes 1804 and 1821, respectively. Because two potentially matching character templates were found, processing continues at step S1606.

Figure 17C:
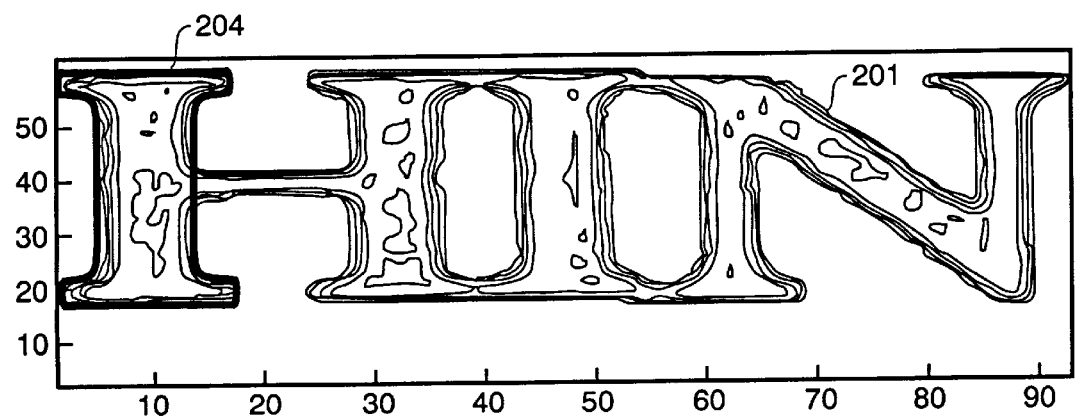

At step S1606, node 1801 is designated closed. As to branch 1802, the remaining unknown character pattern consists approximately of pixels 39 through 95, as shown in FIG. 17B, and as to branch 1820, the remaining unknown character pattern consists approximately of pixels 19 through 95, as shown in FIG. 17C. In both cases, at least one additional character is clearly indicated, and therefore, each of nodes 1804 and 1821 is designated as open.

Because open nodes still exist, processing continues to step S1609. Nodes 1804 and 1821 are second order nodes. As there are two highest order open nodes in the present example, either of nodes 1804 and 1821 may be selected. For purposes of this example, node 1804 is arbitrarily selected.

Next, referring to FIG. 17B, the test in step S1610 would be true if any other previously explored node corresponded to the portion of the unknown character pattern beginning at pixel 39. In this particular step of our example, the test is false, and so the next processing step is step S1602.

Continuing in this manner, assuming that "H" is the first character, the only potentially matching template for the second character is "I". Therefore, in FIG. 18B, node 1804 has only one branch extending from it, branch 1805, which is designated as "I", and because the remaining pixel width is sufficient to contain at least one other character, node 1806 at the end of branch 1805, is designated as open.

Figure 18C:
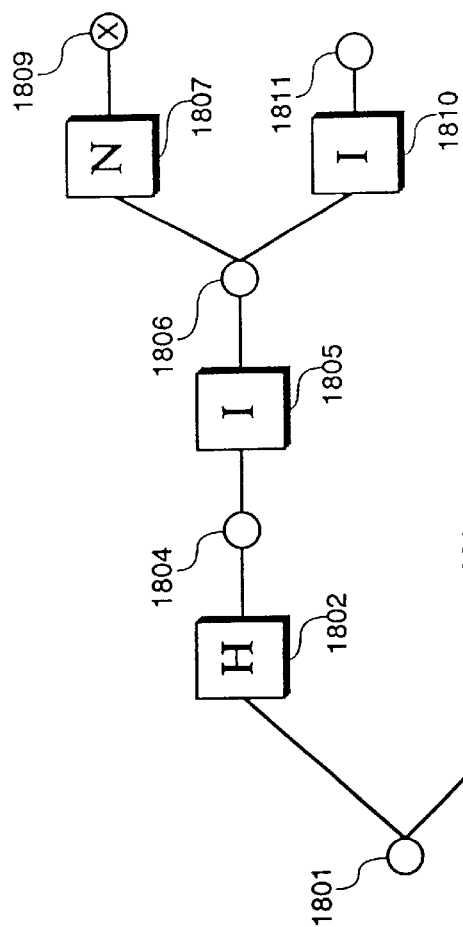

Because node 1806, a third order node, is now the highest order open node, it is evaluated next. Two potentially matching templates are found for the third character position in the current path, a "N" and an "I". Thus, as shown in FIG. 18C, branches 1807 and 1810 ending in nodes 1809 and 1811, respectively, are generated. The "HIN" tentative identification leaves no further portion of the unknown character pattern to be identified, and so in step S1606 node 1809 is designated as closed. However, the "HII" tentative identification path still leaves approximately pixels 69 through 95 to be identified, and so node 1811 is designated as open.

Figure 18D:
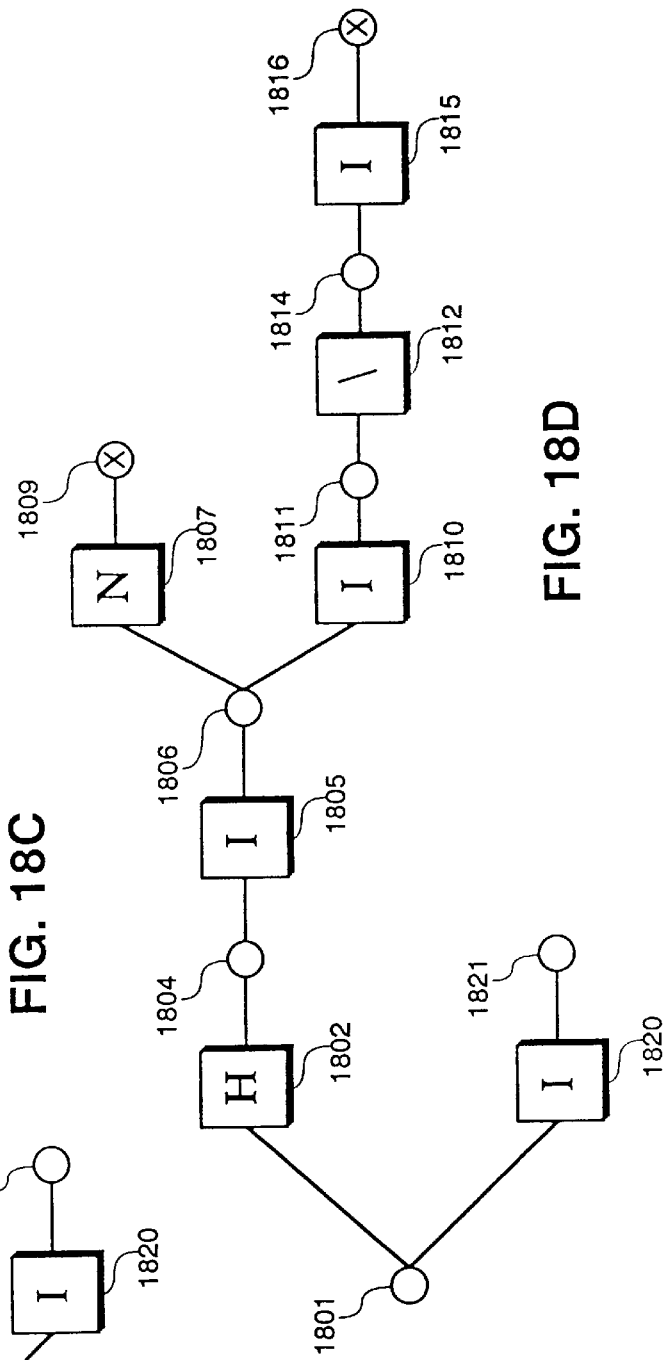

Node 1811, a fourth order node, is now the highest order open node, and it is therefore examined next. Continuing in this manner, only one possibility exists for the fourth character, a "\", and only one possibility exists for the fifth character, an "I", resulting in the tree structure shown in FIG. 18D. After the fifth character, a tentative identification for the entire character pattern ("HII\I") has been made, and therefore, as shown in FIG. 18D, node 1816 is designated as closed.

Figure 17D:
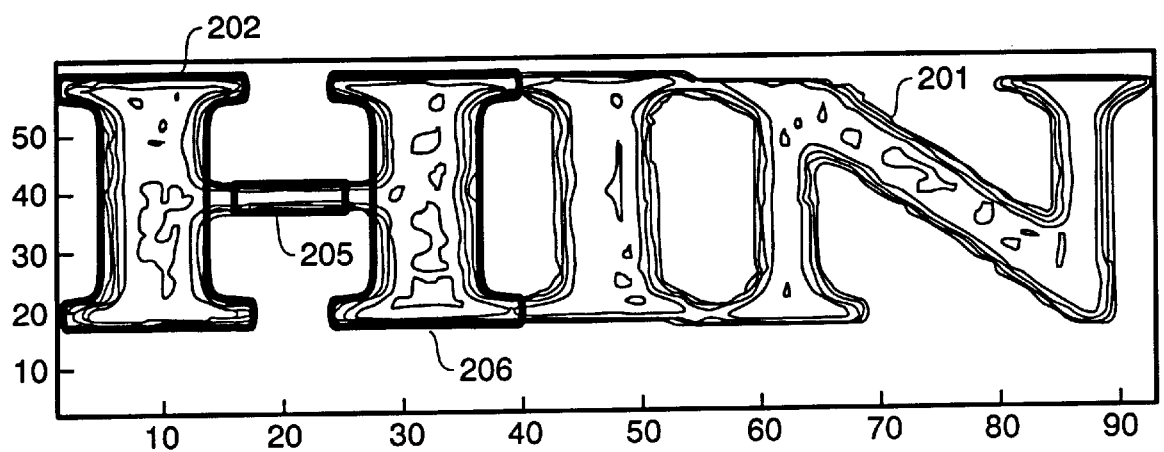
Figure 18E:
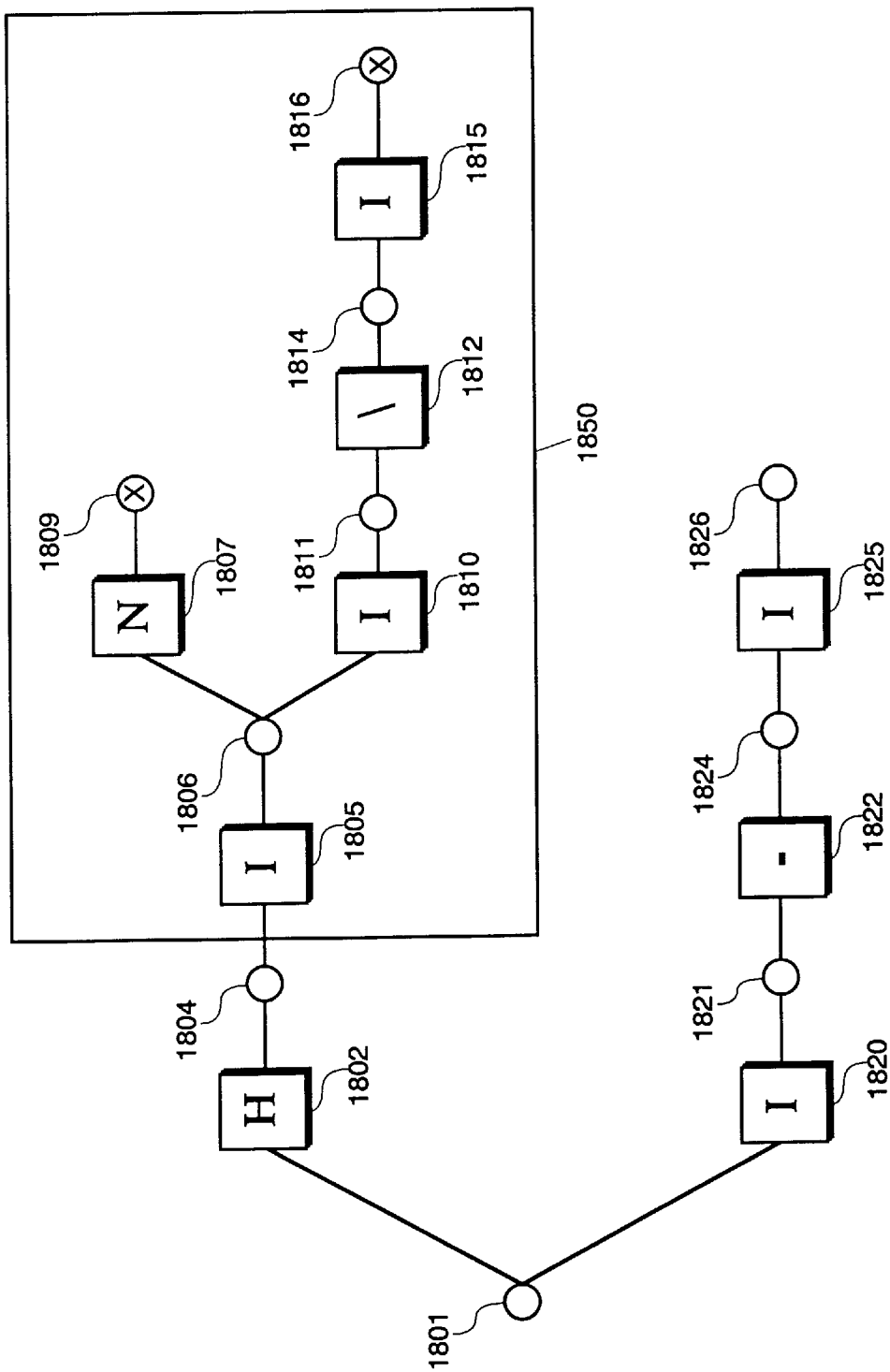
Figure 18F:
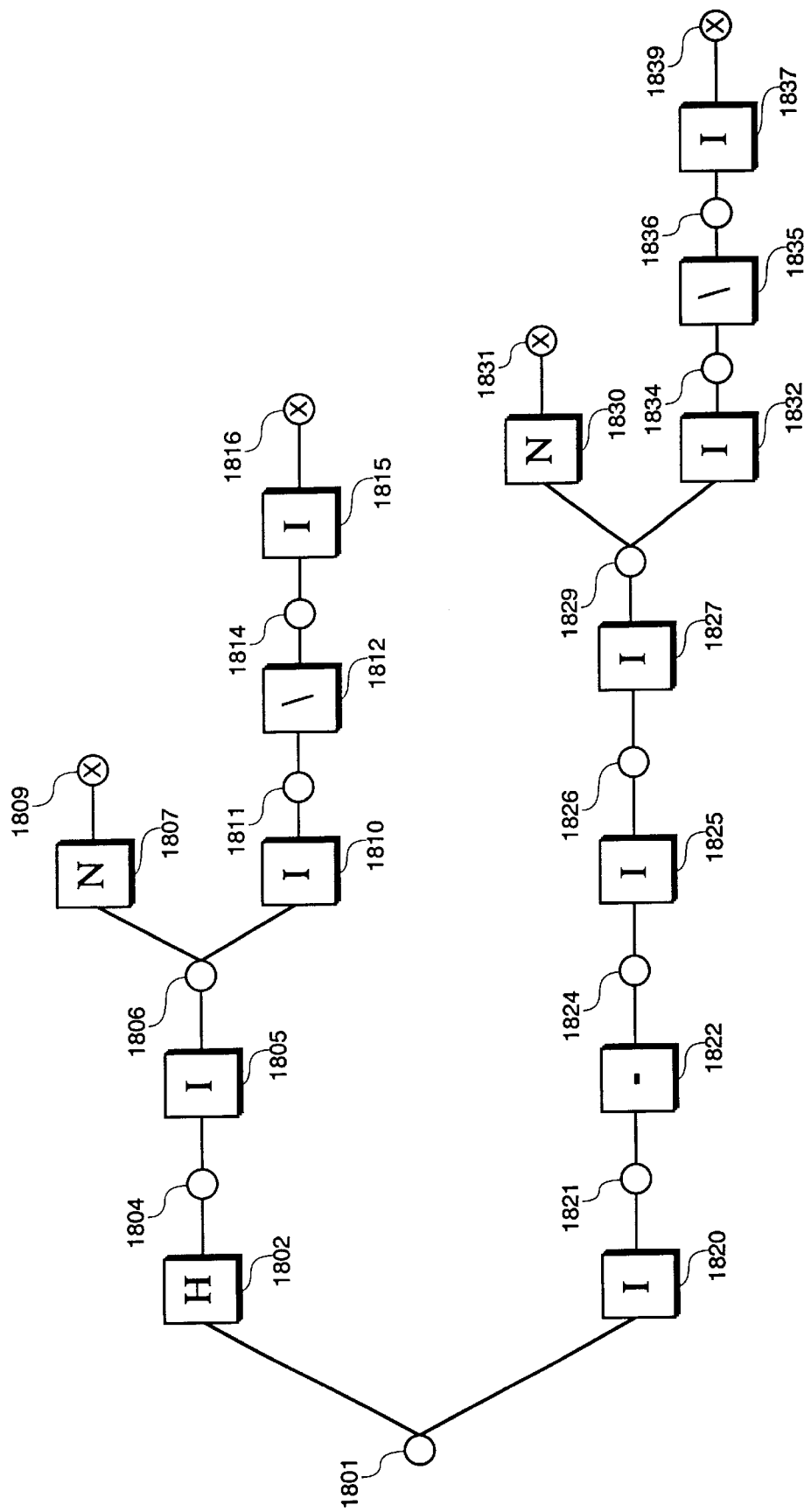

At this point, node 1820 is the highest order open node, and so it is evaluated next. Continuing, only one potentially matching template, "—", is found for the second character position. Similarly, only one potentially matching template, "I", is found for the third character position, resulting in the tree structure shown in FIG. 18E. It is now seen that node 1826 corresponds to a portion of the unknown character pattern that begins at approximately the same horizontal position as node 1804. That is, as shown in FIGS. 17B and 17D, identifying the first three characters of character pattern 201 as "I—I" leaves approximately the same unidentified portion as identifying the first character as "H". Consequently, at this point in the processing the question in step S1610 is answered affirmatively, and processing proceeds to step S1611 where structure 1850 in FIG. 18E is copied to node 1826, resulting in the tree structure shown in FIG. 18F. At this point no open nodes remain, so the test at step S1607 is evaluated as no.

At this point, the following potential paths exist: "HIN", "HII\I", "I-IIN", "I-III\I". None of the paths end in failure, and therefore, assuming that no special cases are involved, the path with the highest average correlation factor will be selected in step S1612.

Figure 19A:
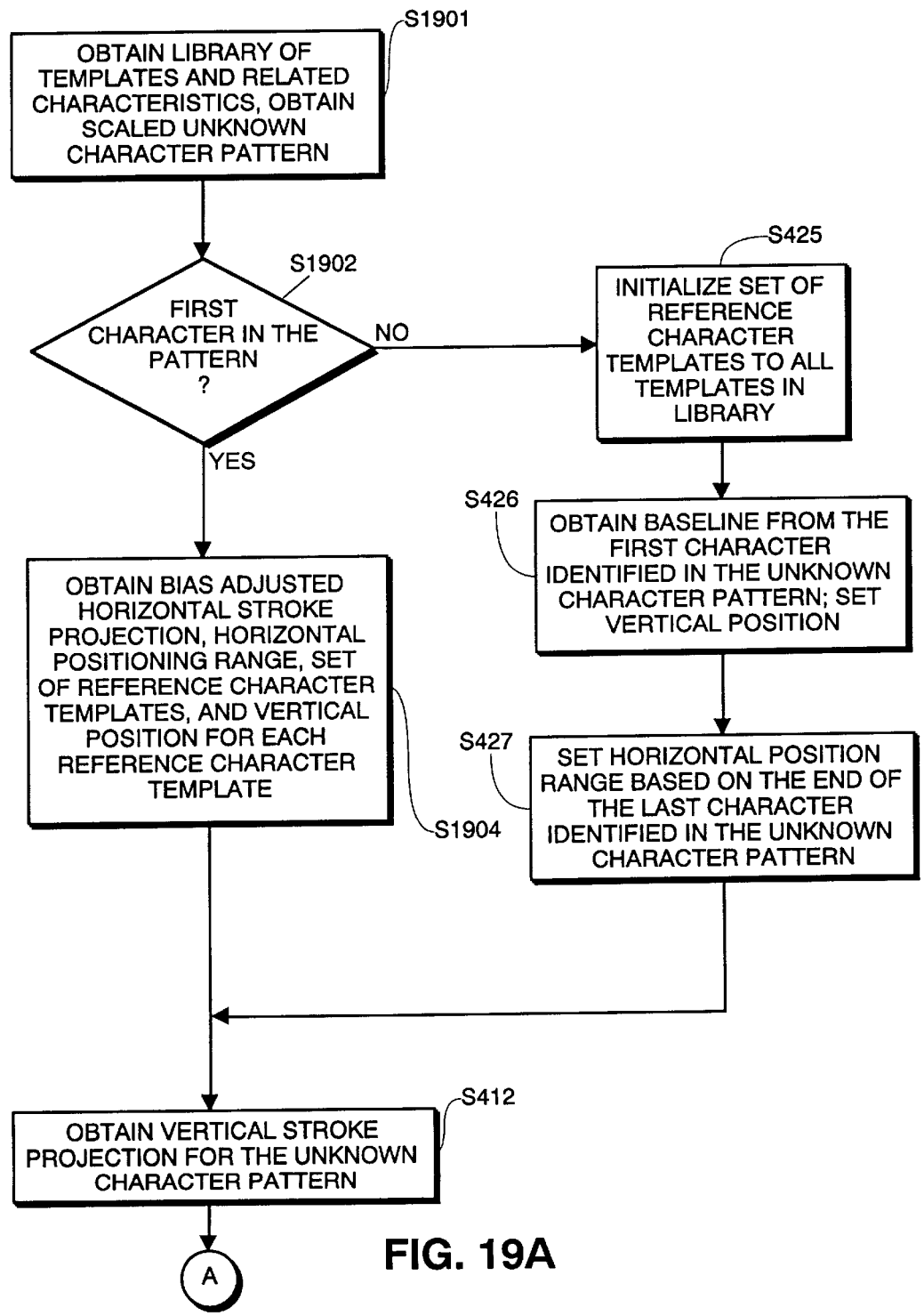
FIG. 19, comprising 19A–19B is a flow diagram showing generation of potentially matching characters for a node while performing tree search processing according to the invention.
Figure 19B:
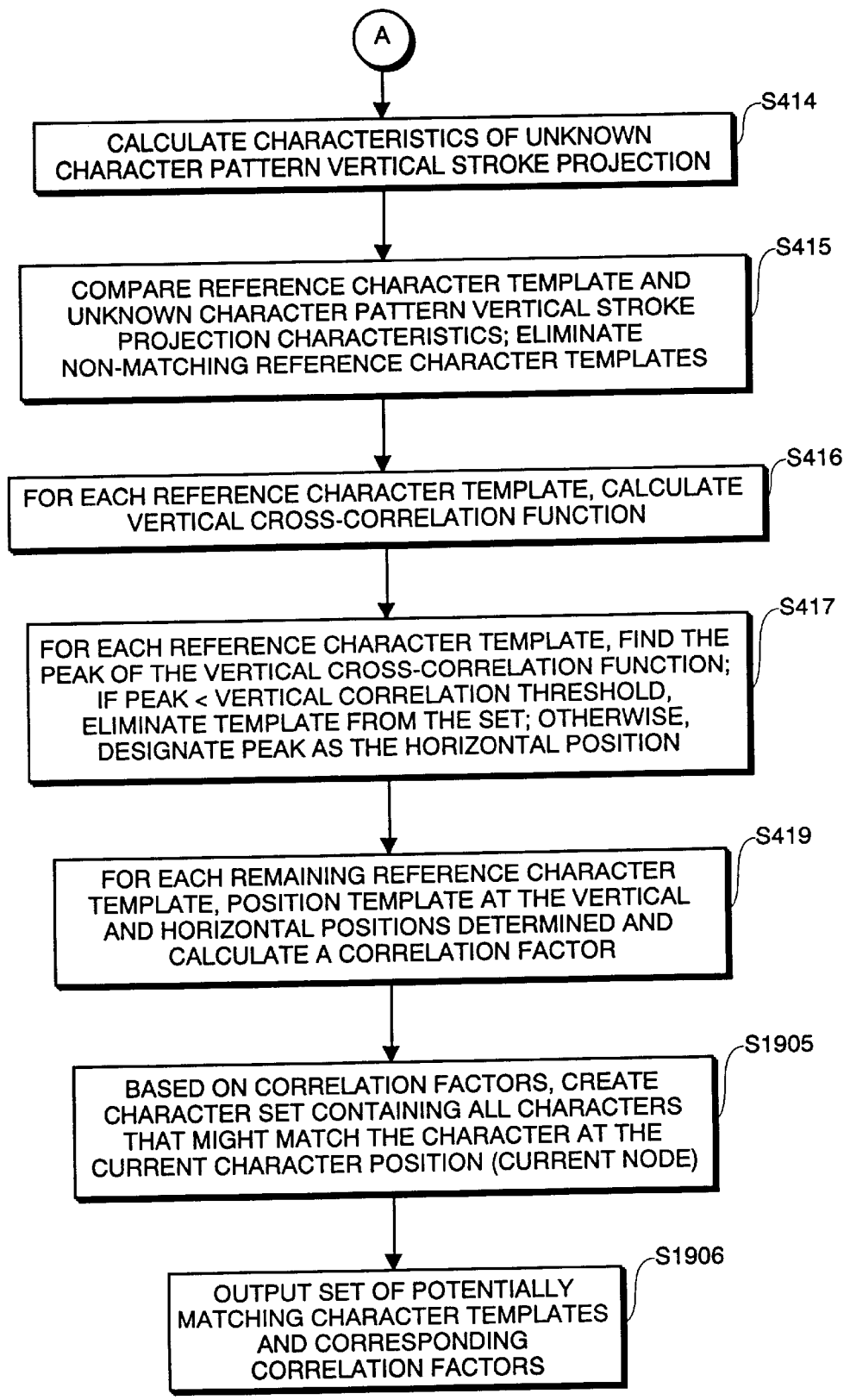

Step S1602 will now be discussed in detail with reference to FIG. 19. The processing to obtain a set of potentially matching character templates for a given character position is similar to the selection of the best matching reference character template as shown in FIG. 4 and discussed above. The most significant difference is that, rather than selecting one template corresponding to the greatest correlation factor, all templates with sufficient correlation factors are selected. Because of the similarities, several of the steps performed pursuant to the processing shown in FIG. 4 are also performed in the same manner here, and are therefore only briefly described below.

In step S1901, the library of templates, related template characteristics, and the scaled unknown character pattern are obtained. In step S1902, it is determined whether the character being evaluated is the first character in the unknown character pattern. If it is the first character, the horizontal positioning range determined in step S406, the set of reference character templates determined in step S409, and the vertical positions for the reference character templates determined in step S414 or S416 are obtained. Otherwise, the set of reference character templates is initialized in step S425, the vertical position is determined in step S426, and the horizontal position range is set in step S427.

Next, in steps S412, S414, S415, S416, S417 and S419, respectively, a vertical stroke projection is calculated, characteristics of the vertical stroke projection are calculated, the reference character template and unknown character pattern characteristics are compared to eliminate non-matching templates, vertical cross-correlation functions are calculated, the peak of each cross-correlation function is found and used to eliminate the template or set the horizontal position, and the remaining templates are positioned with respect to the unknown character pattern and a correlation factor is calculated for each.

In step S1905, rather than selecting the highest correlation factor, a set of templates are identified. This is preferably accomplished by selecting all templates for which the correlation factor exceeds a fixed threshold.

Finally, in step S1906, the set of templates identified, together with the correlation factor calculated for each are output.

The invention has been described with respect to a particular illustrative embodiment. It is to be understood that the invention is not limited to the above described embodiment and that various changes and modifications may be made by those of ordinary skill in the art without departing from the spirit and scope of the invention. For instance, although the above described embodiment processes gray scale images of character patterns, it will be readily apparent that the invention is easily adaptable to processing binary character pattern images.

What is claimed is:

1. A method for identifying plural characters in an unknown character pattern, the unknown character pattern comprising two-dimensional pixel data, said method comprising:

a first generating step of generating potentially matching characters for a first character position in the unknown character pattern;

a second generating step of generating potentially matching characters for a subsequent character position, wherein a spatial location of the subsequent character position is determined in accordance with a potentially matching character string for all previous character positions in the unknown character pattern, and wherein each potentially matching character generated for the subsequent character position is linked to the potentially matching character string, thereby forming plural new potentially matching character strings; and an identifying step of identifying the characters in the unknown character pattern in accordance with one of the potentially matching character strings that is most similar to the unknown character pattern.

2. A method according to claim 1, wherein when a portion of the unknown character pattern has been previously explored and a tentative identification for said portion of the unknown character pattern is again required, a corresponding previously identified structure is copied to a current character position.

3. A method according to claim 1, wherein potentially matching characters are generated by aligning each of plural reference character templates with the unknown character pattern at a current character position, calculating a correlation coefficient between each such reference character template and said unknown character pattern, as so aligned, and selecting those reference character templates having correlation coefficients higher than a specified threshold.

4. A method according to claim 1, further comprising calculating a correlation coefficient between a template corresponding to each potentially matching character and the unknown character pattern, wherein the characters in the unknown character pattern are identified in accordance with said correlation coefficients.

5. An apparatus for identifying plural characters in an unknown character pattern, the unknown character pattern comprising two-dimensional pixel data, said apparatus comprising:

a memory for storing the plural characters and program instruction sequences; and a processor for executing said program instruction sequences stored in said memory, wherein said program instruction sequences include (a) a first generating step to generate potentially matching characters for a first character position in the unknown character pattern, (b) a second generating step to generate potentially matching characters for a subsequent character position, wherein a spatial location of the subsequent character position is determined in accordance with a potentially matching character string for all previous character positions in the unknown character pattern, and wherein each potentially matching character generated for the subsequent character position is linked to the potentially matching character string, thereby forming plural new potentially matching character strings, and (c) an identifying step to identify the characters in the unknown character pattern in accordance with one of the potentially matching character strings that is most similar to the unknown character pattern.

6. An apparatus according to claim 5, wherein said program instruction sequences further include a step to copy a previously identified structure to a current character position.

7. An apparatus according to claim 5, wherein each of the first and second generating steps includes a step to align each of plural reference character templates with the unknown character pattern at a current character position, a step to calculate a correlation coefficient between each such reference character template and said unknown character pattern, as so aligned, and a step to select those reference character templates having correlation coefficients higher than a specified threshold.

8. An apparatus according to claim 5, wherein said program instruction sequences further include a step to calculate a correlation coefficient between a template corresponding to each potentially matching character and the unknown character pattern, wherein the characters in the unknown character pattern are identified in accordance with said correlation coefficients.

9. Computer executable process steps stored on a computer readable medium to identify plural characters in an unknown character pattern, the unknown character pattern comprising two-dimensional pixel data, the process steps comprising:

a first generating step to generate potentially matching characters for a first character position in the unknown character pattern;

a second generating step to generate potentially matching characters for a subsequent character position, wherein a spatial location of the subsequent character position is determined in accordance with a potentially matching character string for all previous character positions in the unknown character pattern, and wherein each potentially matching character generated for the subsequent character position is linked to the potentially matching character string, thereby forming plural new potentially matching character strings; and an identifying step to identify the characters in the unknown character pattern in accordance with one of the potentially matching character strings that is most similar to the unknown character pattern.

10. Computer executable process steps according to claim 9, further comprising a step to copy a previously identified structure to a current character position.

11. Computer executable process steps according to claim 9, wherein each of the first and second generating steps includes a step to align each of plural reference character templates with the unknown character pattern at a current character position, a step to calculate a correlation coefficient between each such reference character template and said unknown character pattern, as so aligned, and a step to select those reference character templates having correlation coefficients higher than a specified threshold.

12. Computer executable process steps according to claim 9, further comprising a step to calculate a correlation coefficient between a template corresponding to each potentially matching character and the unknown character pattern, wherein the characters in the unknown character pattern are identified in accordance with said correlation coefficients.

* * * * *